United States Patent
Kuno et al.

(10) Patent No.: US 8,885,020 B2
(45) Date of Patent: Nov. 11, 2014

(54) VIDEO REPRODUCTION APPARATUS AND VIDEO REPRODUCTION METHOD

(75) Inventors: Shinji Kuno, Ome (JP); Masahiro Ozawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 463 days.

(21) Appl. No.: 12/896,762

(22) Filed: Oct. 1, 2010

(65) Prior Publication Data

US 2011/0080470 A1    Apr. 7, 2011

(30) Foreign Application Priority Data

Oct. 2, 2009    (JP) .................................. 2009-230905

(51) Int. Cl.

| | |
|---|---|
| H04N 13/02 | (2006.01) |
| H04N 13/04 | (2006.01) |
| G06F 3/0346 | (2013.01) |
| G06F 3/01 | (2006.01) |
| H04N 13/00 | (2006.01) |
| G06F 3/03 | (2006.01) |

(52) U.S. Cl.

CPC ............ *G06F 3/017* (2013.01); *H04N 13/0468* (2013.01); *G06F 3/0346* (2013.01); *H04N 13/0014* (2013.01); *G06F 3/0304* (2013.01)
USPC .......................................................... 348/46

(58) Field of Classification Search
None
See application file for complete search history.

(56) References Cited

U.S. PATENT DOCUMENTS

| | | | | |
|---|---|---|---|---|
| 5,594,469 | A | * | 1/1997 | Freeman et al. ............... 345/158 |
| 2008/0132332 | A1 | * | 6/2008 | Pryor ............................... 463/31 |
| 2008/0150945 | A1 | * | 6/2008 | Wang et al. .................... 345/427 |
| 2008/0170776 | A1 | * | 7/2008 | Albertson et al. ............. 382/154 |

FOREIGN PATENT DOCUMENTS

| | | |
|---|---|---|
| JP | H08-315154 A | 11/1996 |
| JP | H11-338120 A | 12/1999 |
| JP | 2007-141156 A | 6/2007 |
| JP | 2008-146243 A | 6/2008 |

OTHER PUBLICATIONS

Li et al. "Real time Hand Gesture Recognition using a Range Camera" Australasian Conference on Robotics and Automation, Dec. 2009.*

* cited by examiner

*Primary Examiner* — Sath V Perungavoor
*Assistant Examiner* — Kate Luo
(74) *Attorney, Agent, or Firm* — Knobbe Martens Olson & Bear, LLP

(57) ABSTRACT

According to one embodiment, a video reproduction apparatus includes an image generator, a motion recognizer, a marker generator and an image synthesizer. The image generator is configured to generate a first pair of images with a difference in visual field for an operational object. The motion recognizer is configured to recognize three-dimensional gesture of a user. The marker generator is configured to identify three-dimensional designated coordinates based on the gesture recognized by the motion recognizer, and generate a second pair of images with a difference in visual field for a marker corresponding to the designated coordinates. The image synthesizer is configured to synthesize the first pair of images with the second pair of images to generate a third pair of images.

4 Claims, 21 Drawing Sheets

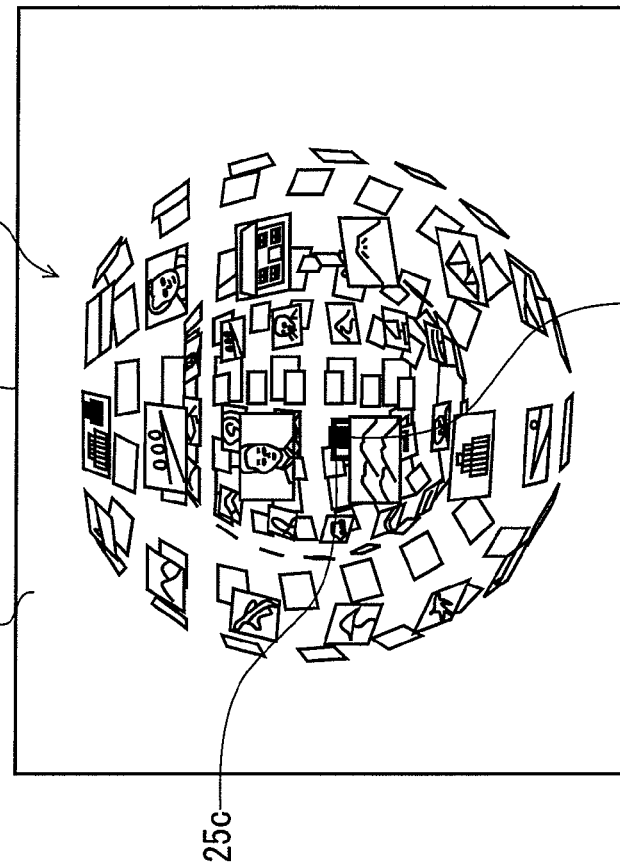
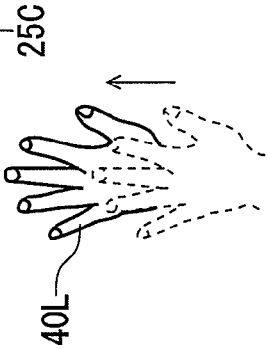
FIG.11A
25A 3D SYNTHESIZED IMAGE
25B 3D-OSD
25C 3D MARKER
25c SELECTION FRAME
40L LEFT HAND
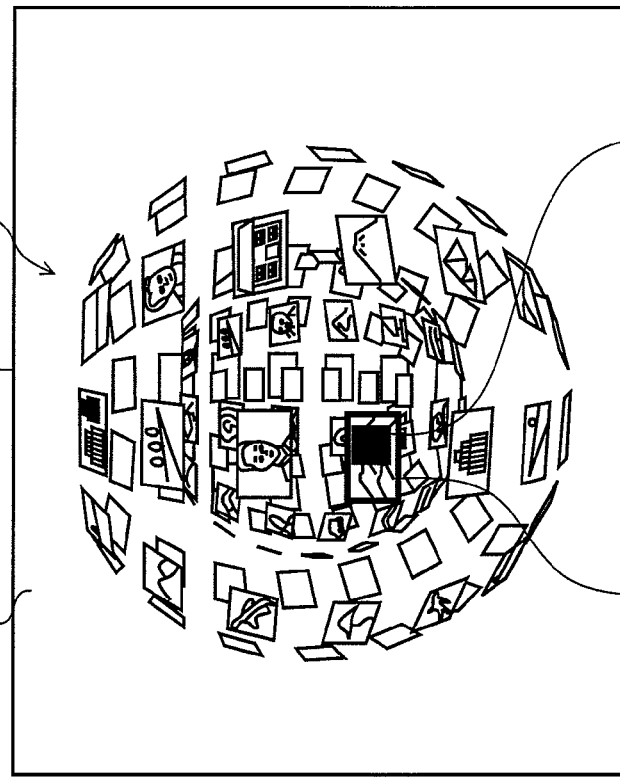
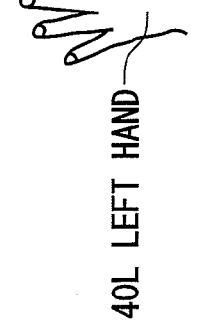
FIG.11B

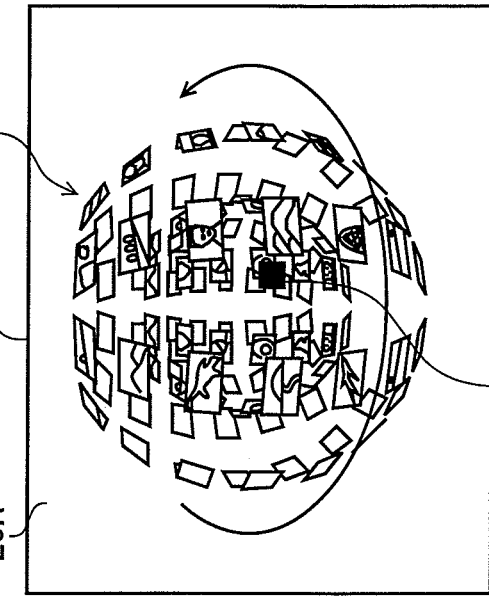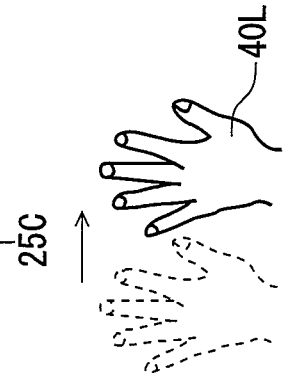
FIG.12A
25A 3D SYNTHESIZED IMAGE
25C 3D MARKER
40L LEFT HAND
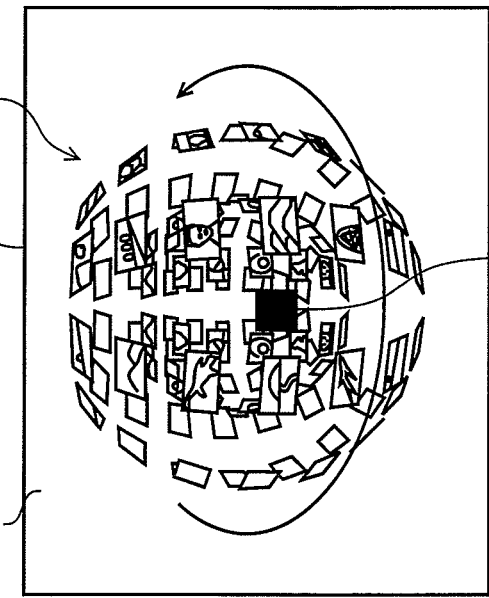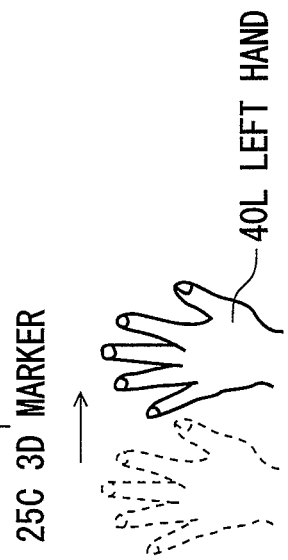
FIG.12B FIG.14A
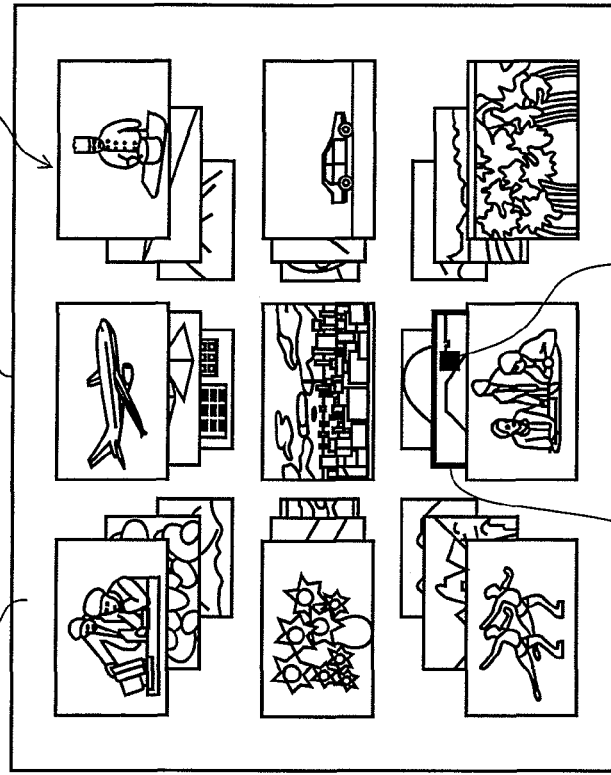
25A 3D SYNTHESIZED IMAGE   25E 3D-OSD
25 SYNTHESIZED IMAGE
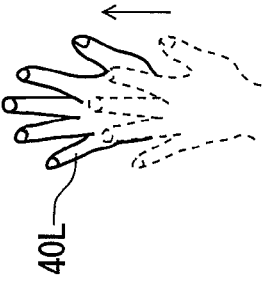
25C 3D MARKER
25c SELECTION FRAME
40L LEFT HAND
FIG.14B
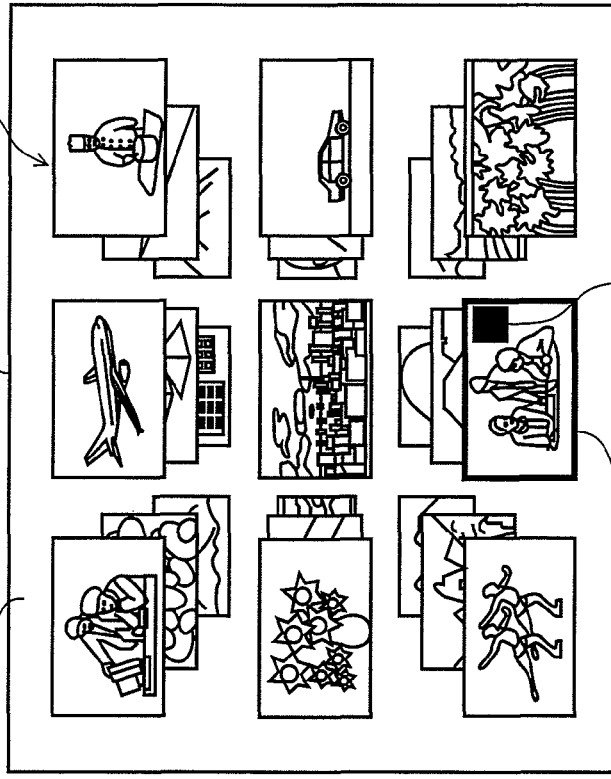
25E
25
25C
25A
25c
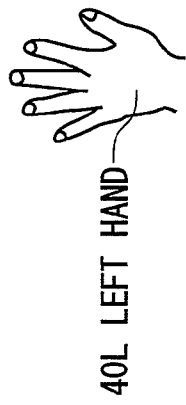
40L 25A 3D SYNTHESIZED IMAGE
25E 3D-OSD
25C 3D MARKER
40L LEFT HAND

40L

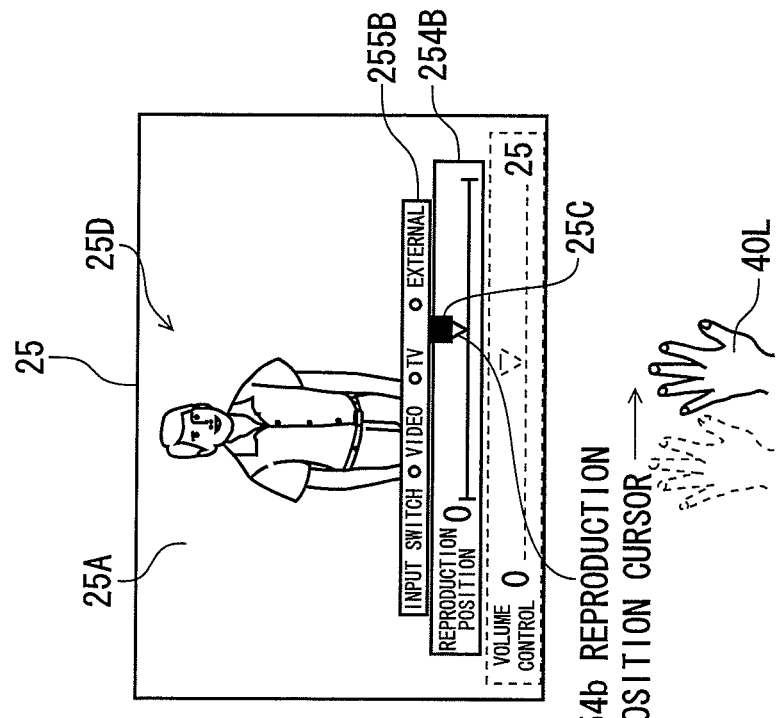
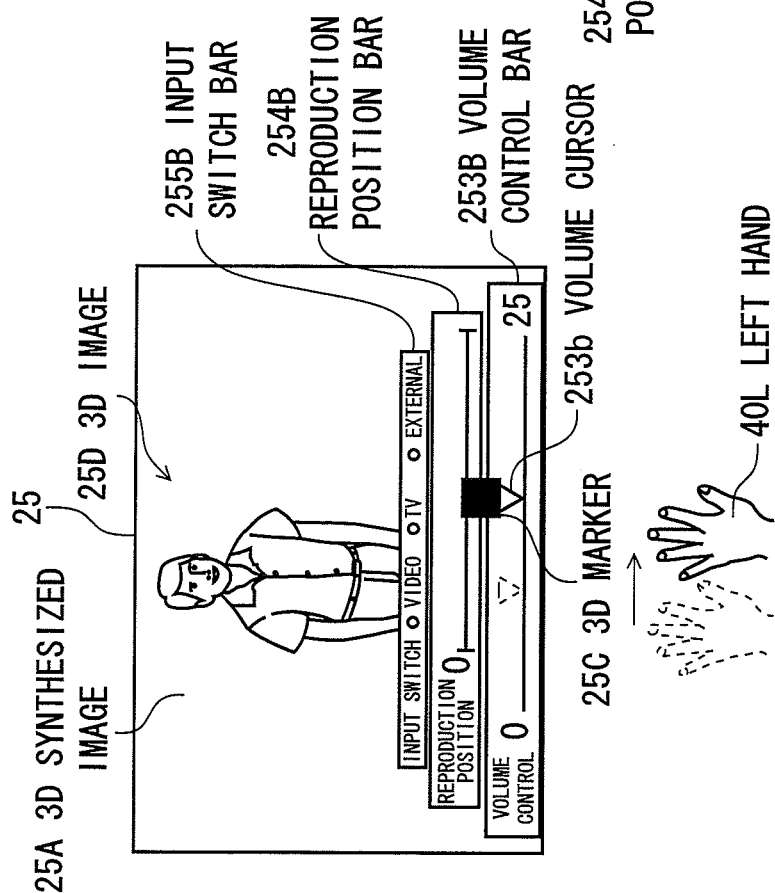

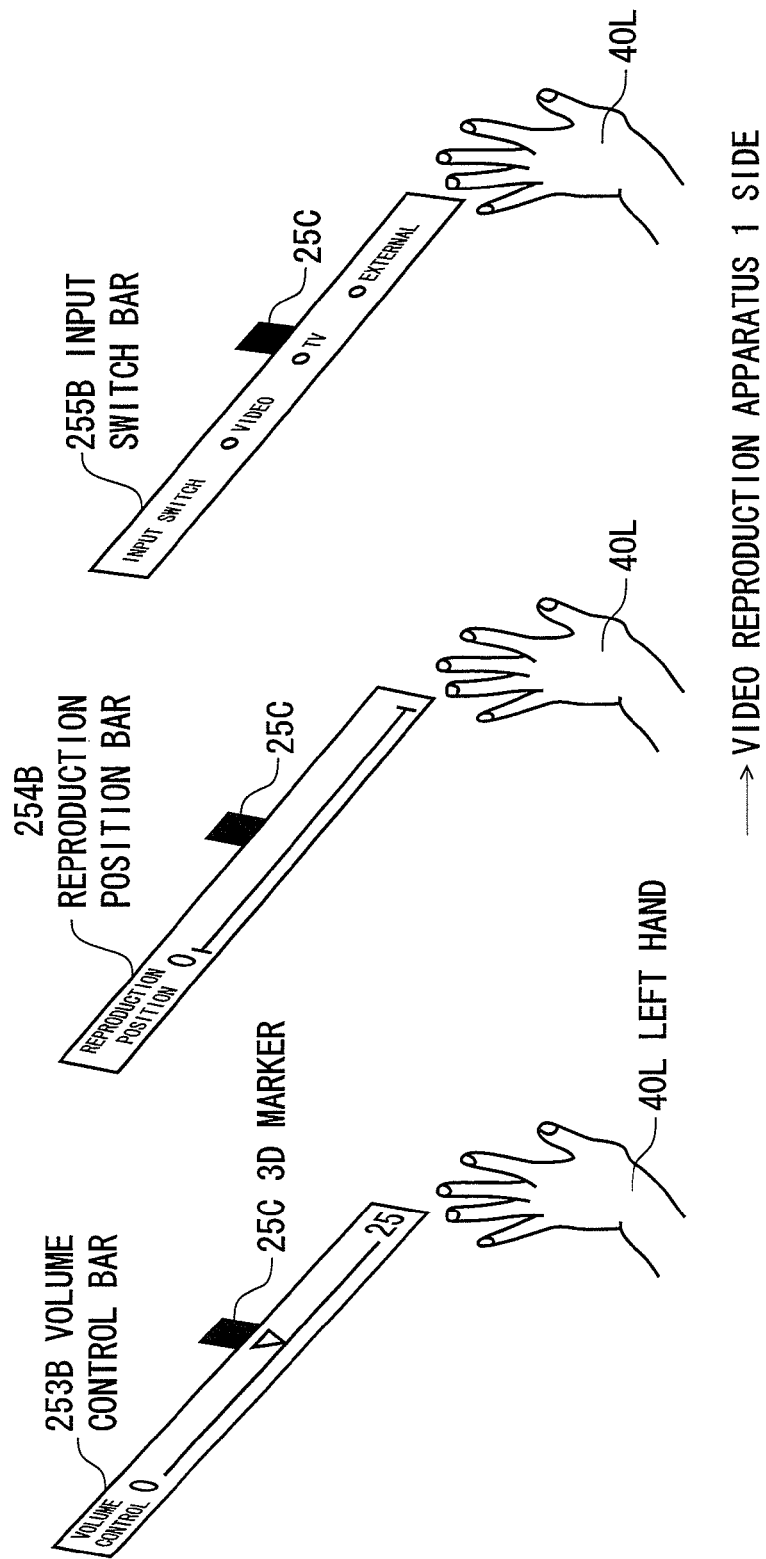

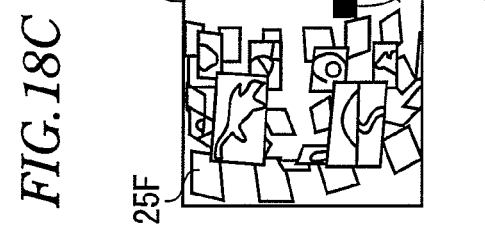
FIG.18A
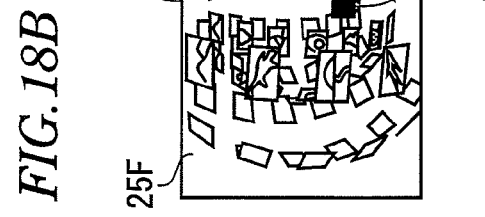
FIG.18B
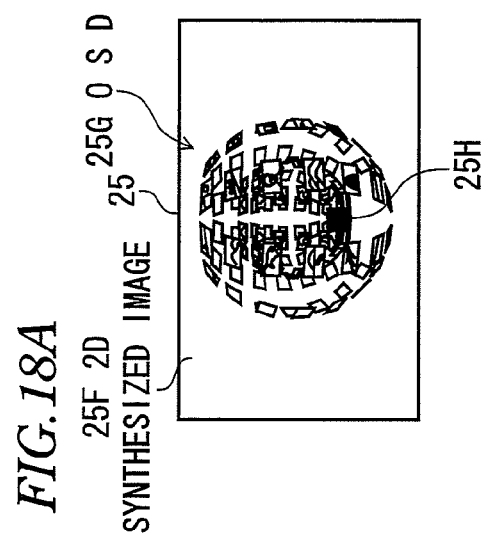
FIG.18C
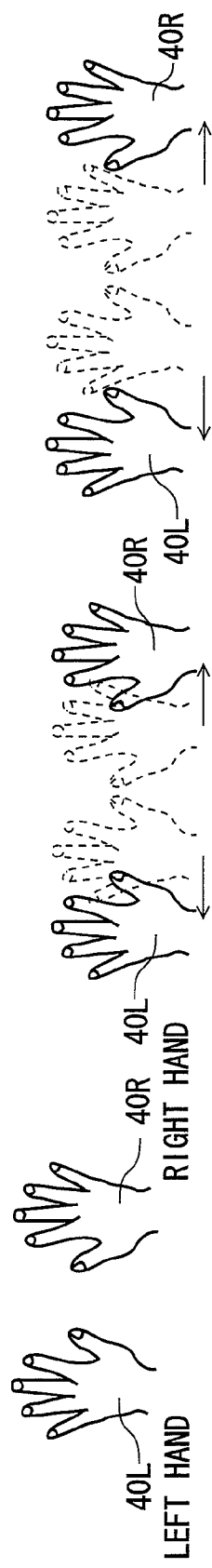

VIDEO REPRODUCTION APPARATUS AND VIDEO REPRODUCTION METHOD

CROSS REFERENCE TO RELATED APPLICATION(S)

The present disclosure relates to the subject matters contained in Japanese Patent Application No. 2009-230905 filed on Oct. 2, 2009, which are incorporated herein by reference in its entirety.

BACKGROUND

1. Field

Embodiments described herein relate generally to a video reproduction apparatus and a video reproduction method.

2. Description of the Related Art

A video reproduction apparatus which operates in accordance with a shape of a user's hand photographed by a camera is disclosed.

The video reproduction apparatus includes a camera, a hand shape database, a hand shape recognizer and a hand gesture analysis portion. The camera captures an image of a user. The hand shape database stores a plurality of predetermined hand shapes. The hand shape recognizer recognizes the shape of a hand of the user in the image captured by the camera, based on the hand shapes stored in the hand shape database. The hand gesture analysis portion analyzes the gesture of the hand of the user recognized by the hand shape recognizer. The hand gesture analysis portion transmits an operation signal to software based on the result of the analysis of the hand's gesture. Thus, the user can operate the software with the gesture of his/her hand.

BRIEF DESCRIPTION OF THE DRAWINGS

A general configuration that implements the various feature of embodiments will be described with reference to the drawings. The drawings and the associated descriptions are provided to illustrate embodiments and not to limit the scope of the embodiments.

FIGS. 11A and 11B are schematic views showing the gesture of a user and a display example of the video reproduction apparatus;

FIGS. 12A and 12B are schematic views showing the gesture of the user and another display example of the video reproduction apparatus;

FIGS. 14A and 14B are schematic views showing the gesture of the user and a display example of the video reproduction apparatus;

FIGS. 16A and 16B are schematic views showing the gesture of the user and further another display example of the video reproduction apparatus;

FIGS. 16C to 16E are schematic views showing the gesture of the user and further another display example of the video reproduction apparatus;

FIGS. 18A to 18C are schematic views showing the gesture of the user and another display example of the video reproduction apparatus.

DETAILED DESCRIPTION

According to one embodiment, a video reproduction apparatus includes an image generator, a motion recognizer, a marker generator and an image synthesizer. The image generator is configured to generate a first pair of images with a difference in visual field for an operational object. The motion recognizer is configured to recognize three-dimensional gesture of a user. The marker generator is configured to identify three-dimensional designated coordinates based on the gesture recognized by the motion recognizer, and generate a second pair of images with a difference in visual field for a marker corresponding to the designated coordinates. The image synthesizer is configured to synthesize the first pair of images with the second pair of images to generate a third pair of images.

According to another aspect of the invention, a video reproduction method includes generating a first pair of images with a difference in visual field for an operational object, recognizing three-dimensional gesture of a user, identifying three-dimensional designated coordinates based on the recognized gesture, generating a second pair of images with a difference in visual field for a marker corresponding to the three-dimensional designated coordinates, and synthesizing the first pair of images with the second pair of images to generate a third pair of images.

According to still another aspect of the invention, a video reproduction apparatus includes an image information generator, a display module, a position detector and a selector.

The image information generator is configured to generate first image information corresponding to a first view point and second image information corresponding to a second view point which is different from the first view point. The display module is configured to synthesize the first image information and the second image information generated by the image information generator, generate a first display image and a second display image to be put under the first display image, and display the first and second display images on a display screen. The position detector is configured to detect a position of an external operation portion. The selector is configured to select the first display image when the position of the external operation portion detected by the position detector is a first position, and select the second display image when the position of the external operation portion detected by the position detector is a second position closer to the display screen than the first position.

Figure 1A:
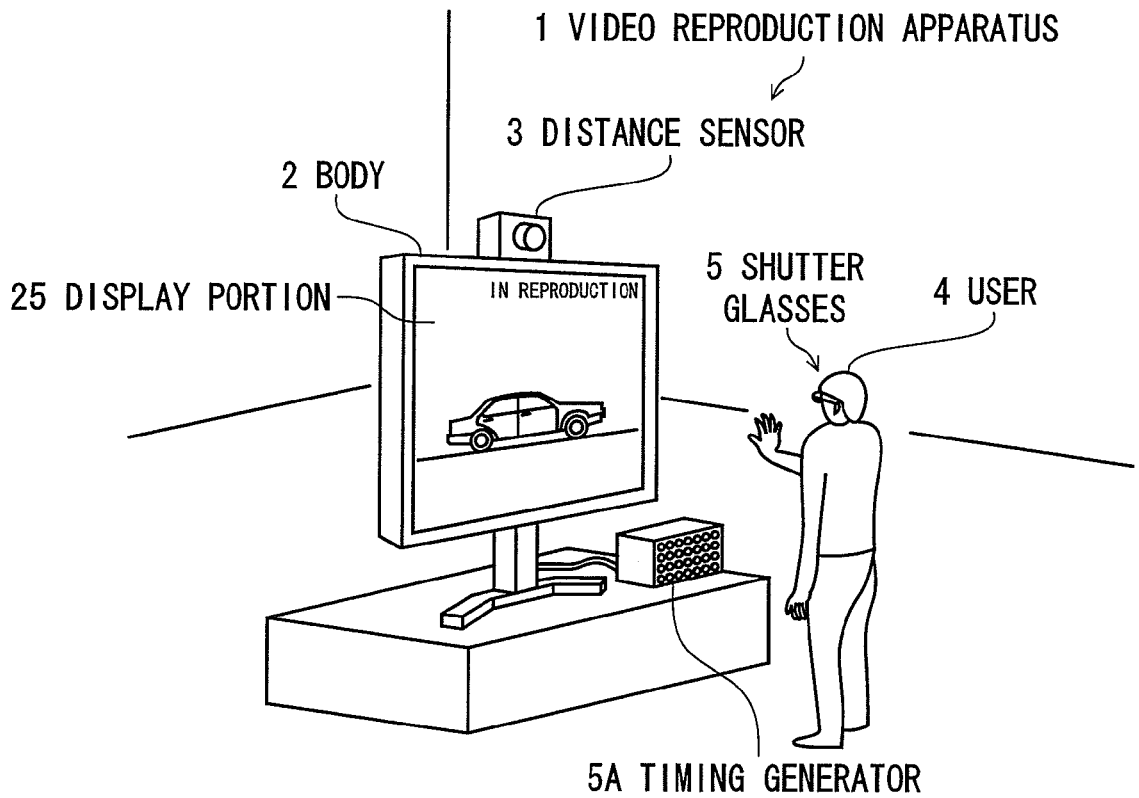
FIG. 1A is a schematic view exemplary showing a configuration of a video reproduction apparatus according to an embodiment.

FIG. 1A is a schematic view showing a configuration of a video reproduction apparatus according to an embodiment.

A video reproduction apparatus 1 can reproduce video contents received by a tuner provided inside a body 2 or video contents stored in a storage portion such as an HDD (Hard Disk Drive) provided inside the body 2. As a result of the reproduction, the video reproduction apparatus 1 displays a video image on a display portion (display module) 25 having a display screen, such as an LCD (Liquid Crystal Display). The video contents include two-dimensional (hereinafter referred to as "2D") video contents or three-dimensional (hereinafter referred to as "3D") video contents consisting of a pair of video images with a difference in visual field. In addition, an OSD (On-Screen Display) video image serving for selecting video contents to be reproduced or for operating video contents being reproduced is 3D-displayed.

The "pair of video images with a difference in visual field" herein means a pair of a right visual field image and a left visual field image in visual fields from the coordinates of view points set on a virtual space correspondingly to right and left eyes of a user 4 respectively. For example, the "pair of video images with a difference in visual field" designates a synthesization of a video image on a display screen where video contents to be displayed on the display portion 25 are viewed from the right side of the display portion 25 and a video image on a display screen where the same video contents are viewed from the left side of the display portion 25.

When 3D video contents are reproduced, the video reproduction apparatus 1 alternately reproduces two video images with a difference in visual field included in the 3D video contents, and opens and closes a right shutter 5R and a left shutter 5L (which will be described later) of shutter glasses 5 worn by the user 4, alternately and synchronously with the reproduction of the 3D video contents. The synchronization between the reproduction of the 3D video contents and the shutter glasses 5 is achieved by generating timing signals from a timing generator 5A connected to the video reproduction apparatus 1, and making the shutter glasses 5 receive the timing signals. In the following description, when mention is made on 3D, video images are assumed to be reproduced to give stereo vision to the user 4 in the aforementioned method or an alternative method unless otherwise stated.

In addition, the video reproduction apparatus 1 has a distance sensor (position detector) 3 for acquiring information about a distance to the user 4 facing the video reproduction apparatus 1. The gesture of the user 4 is recognized based on the distance information acquired by the distance sensor 3.

The distance sensor 3, for example, has an infrared laser or an infrared LED and an infrared camera or an infrared sensor consisting of a plurality of light-receiving devices. Reflection of infrared light emitted by the infrared laser or the infrared LED is photographed by the infrared camera or detected by the infrared sensor to acquire the distance information.

Figure 1B:
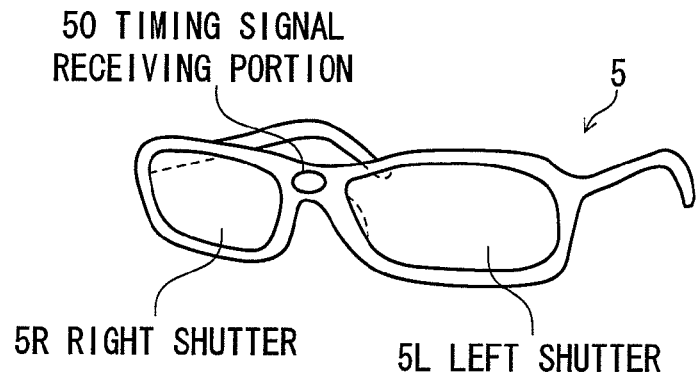
FIG. 1B is a schematic view exemplary showing a configuration of shutter glasses.

FIG. 1B is a schematic view showing a configuration of the shutter glasses 5.

The shutter glasses 5 has a right shutter 5R and a left shutter 5L each having an electronically controlled shutter, and a timing signal receiving portion 50 for receiving timing signals. The shutter glasses 5 includes a control circuit for opening and closing the right shutter 5R and the left shutter 5L alternately based on the timing signals.

In the aforementioned configuration shown in FIGS. 1A and 1B, the user 4 viewing the 3D video contents makes use of a part of his/her body to control the operation of the video reproduction apparatus 1.

Figure 2:
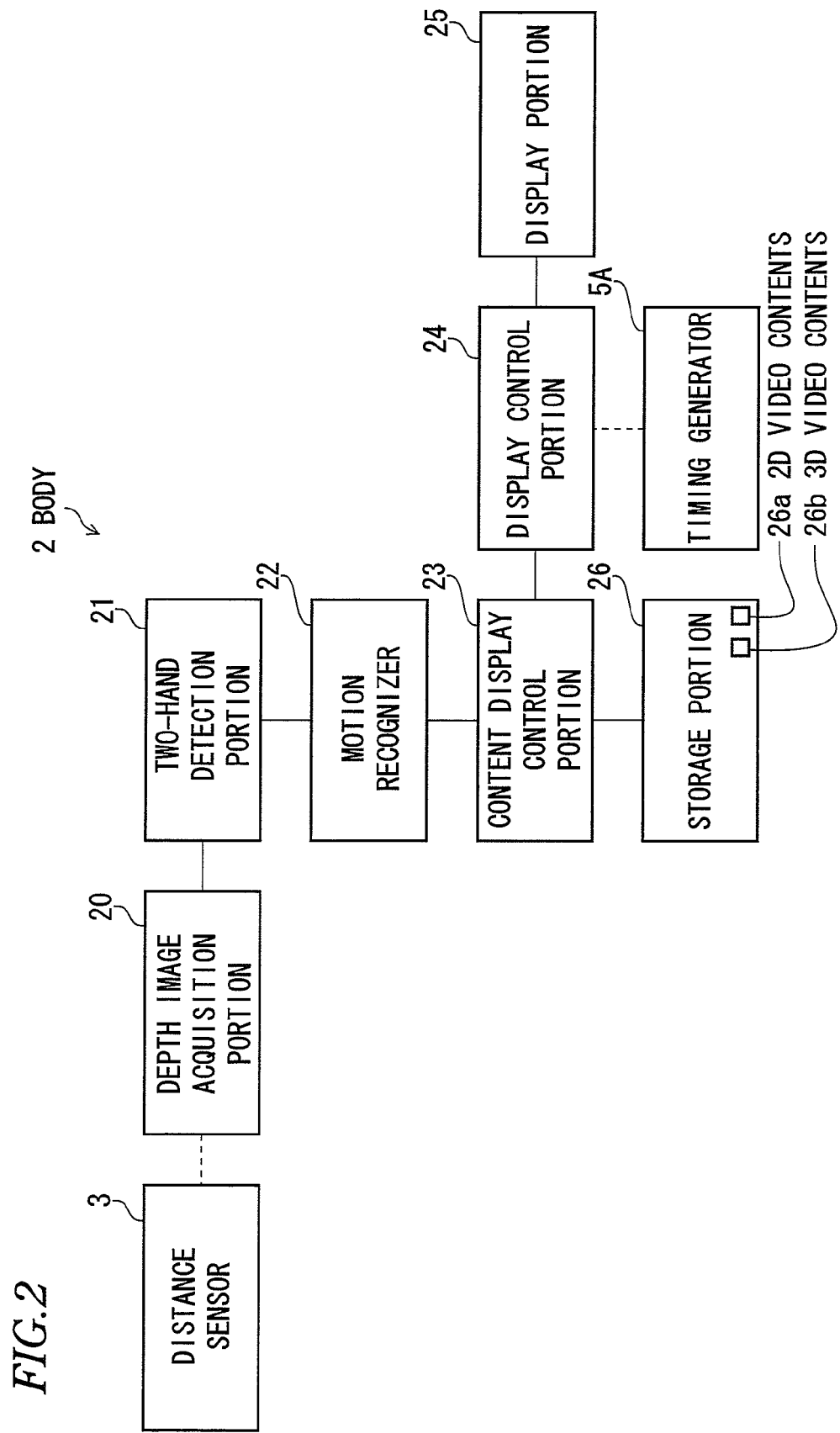
FIG. 2 is a block diagram exemplary showing the configuration of the video reproduction apparatus according to the embodiment.

FIG. 2 is a block diagram showing the configuration of the video reproduction apparatus 1 according to the embodiment.

The body 2 of the video reproduction apparatus 1 has a depth image acquisition portion 20, a two-hand detection portion 21, a motion recognizer 22, a content display control portion 23, a display control portion 24, a display portion 25 and a storage portion 26.

The depth image acquisition portion 20 acquires the distance information acquired by the distance sensor 3 as a depth image.

The two-hand detection portion 21 detects two hands (or one hand) of the user 4 as designated regions from the depth image acquired by the depth image acquisition portion 20. As for the detection method, for example, a subject with the smallest depth in view of the video reproduction apparatus 1 is recognized as a hand. When there are two separate subjects, right and left hands are recognized by determination as to whether they are located in the left or the right respectively.

The motion recognizer 22 recognizes the positions and motions of the two hands detected by the two-hand detection portion 21, in the depth direction and in a direction perpendicular to the depth direction. The motion recognizer 22 outputs a user's gesture signal corresponding to the motions to the content display control portion 23. The motion recognition is performed on the left and right hands individually so that a synthesization of those motions or the like can be also recognized.

The content display control portion 23 carries out processing for reproducing 2D video contents 26a or 3D video contents 26b which will be described later, processing for generating and displaying an OSD image for operating the contents, displaying a marker generated based on the user's gesture signal supplied from the motion recognizer 22, and controlling each part of the content display control portion 23 based on the user's gesture signal outputted from the motion recognizer 22. The OSD image and the marker are 3D-displayed.

The display control portion 24 controls the display of the video contents reproduced by the content display control portion 23, while controlling the timing generator 5A synchronously with timing of reproducing 3D image contents, that is, switching two video images with a difference in visual field.

The display portion 25 is operated under the control of the display control portion 24. The display portion 25 is made of an LCD or the like for displaying video contents.

The storage portion 26 stores the 2D video contents 26a and the 3D video contents 26b. The 2D video contents 26a are general video contents where a movie, a TV program or the like consisting of a video image is recorded. The 3D video contents 26b are 3D-viewing video contents including a right visual field image and a left visual field image.

Figure 3:
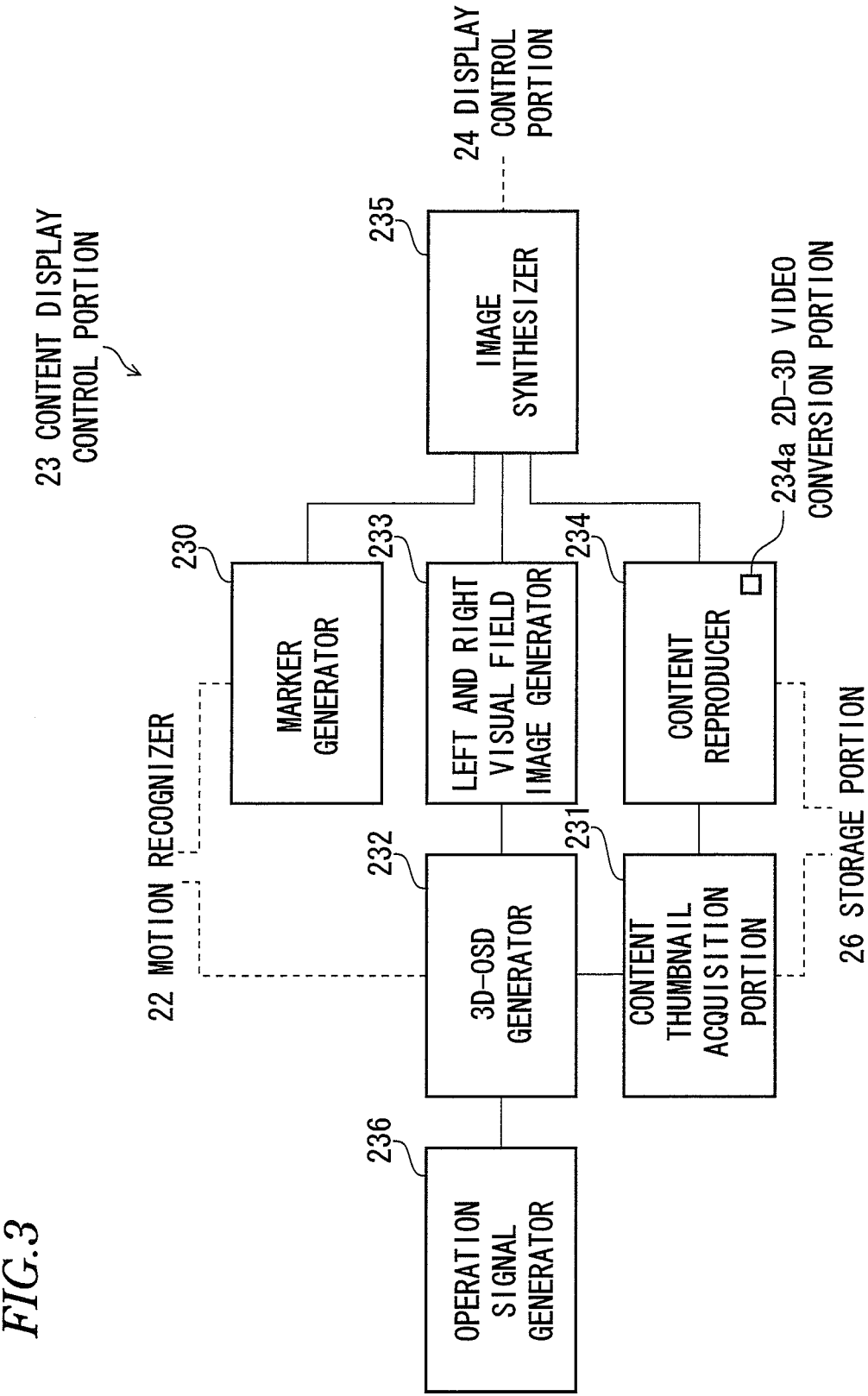
FIG. 3 is a schematic view exemplary showing a configuration of a content display control portion.

FIG. 3 is a schematic view showing the configuration of the content display control portion 23.

The content display control portion 23 has a marker generator 230, a content thumbnail acquisition portion 231, a 3D-OSD generator (selector) 232, a left and right visual field image generator (image information generator) 233, a content reproducer 234, an image synthesizer 235 and an operation signal generator 236.

The marker generator 230 generates left and right visual field images of a marker in consideration of a difference in visual field based on the user's gesture signal outputted by the motion recognizer 22. Thus, the positions of the hands of the user 4 are displayed as the marker on a 3D image displayed on the display portion 25.

From the 2D video contents 26a and the 3D video contents 26b stored in the storage portion 26, the content thumbnail acquisition portion 231 acquires thumbnails for use on a 3D-OSD which will be described later. As the acquired thumbnails, 2D thumbnails or 3D thumbnails can be acquired, and 3D thumbnails can be also generated artificially from 2D thumbnails.

The 3D-OSD generator 232 generates a list of video contents on a 3D virtual space in a display method where thumbnails of the video contents are set out and displayed on spheres or in a display method where thumbnails set out like tiles are displayed in a plurality of layers. In addition, the 3D-OSD generator 232 generates 3D display images of a reproduction button, a stop button to be used for controlling the operation of video contents being reproduced. In addition, the 3D-OSD generator 232 recognizes the positions of the hands of the user 4 fed from the motion recognizer 22, as designated coordinates on the virtual space, so as to supply the designated coordinates for the 3D-OSD and the user's gesture signal outputted by the motion recognizer 22 to the operation signal generator 236.

For the list of the video contents and the display images to be used for controlling the operation, which have been generated by the 3D-OSD generator 232, the left and right visual field image generator 233 generates a right visual field image (first image information) and a left visual field image (second image information) based on visual fields from view point coordinates set on the virtual space correspondingly to the right and left eyes respectively.

The content reproducer 234 decodes and reproduces the 2D video contents 26a and the 3D video contents 26b. In addition, the content reproducer 234 has a 2D-3D video conversion portion for artificially generating 3D video contents from the 2D video contents 26a and reproducing the 3D video contents.

The image synthesizer 235 synthesizes the left and right visual field images of the marker generated by the marker generator 230, the left and right visual field images of the 3D-OSD generated by the left and right visual field image generator 233, and the left and right visual field images reproduced by the content reproducer 234.

The operation signal generator 236 generates control signals for controlling each part of the content display control portion 23 based on the positions of the designated coordinates with respect to the 3D-OSD supplied from the 3D-OSD generator 232 and the user's gesture signal supplied from the motion recognizer 22. For example, video contents are reproduced when a marker indicates a reproduction control button in the 3D-OSD, and the display of the OSD is enlarged when the two hands of the user behave to open outward from the center.

Figure 4:
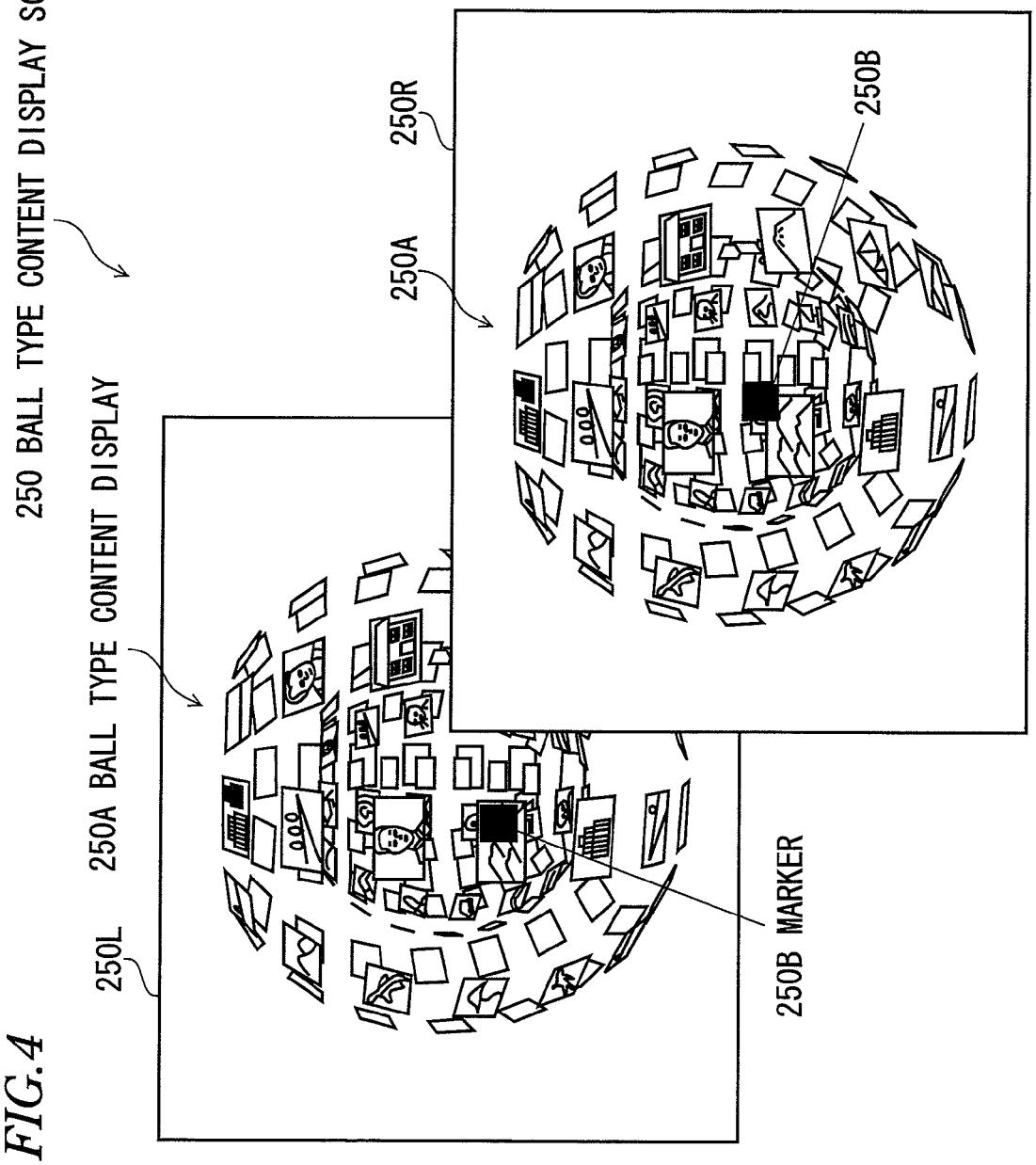
FIG. 4 is a schematic view showing a configuration example of a 3D video image displayed on a display portion.

FIG. 4 is a schematic view showing a configuration example of a 3D image displayed on the display portion 25.

A ball type content display screen 250 is formed by displaying a pair of images consisting of a right visual field ball type content display screen 250L and a left visual field ball type content display screen 250R alternately on the display portion 25. Each visual field ball type content display screen 250L, 250R has a ball type content display 250A and a marker 250B. In the ball type content display 250A, thumbnails of contents are disposed on a plurality of spheres. The marker 250B indicates a position designated by a hand of the user.

The ball type content display 250A has a plurality of spheres. Equal numbers of thumbnails are disposed on the spheres respectively. The user can move a view point to approach the center of the spheres or keep away therefrom or to rotate the spheres.

Figure 5:
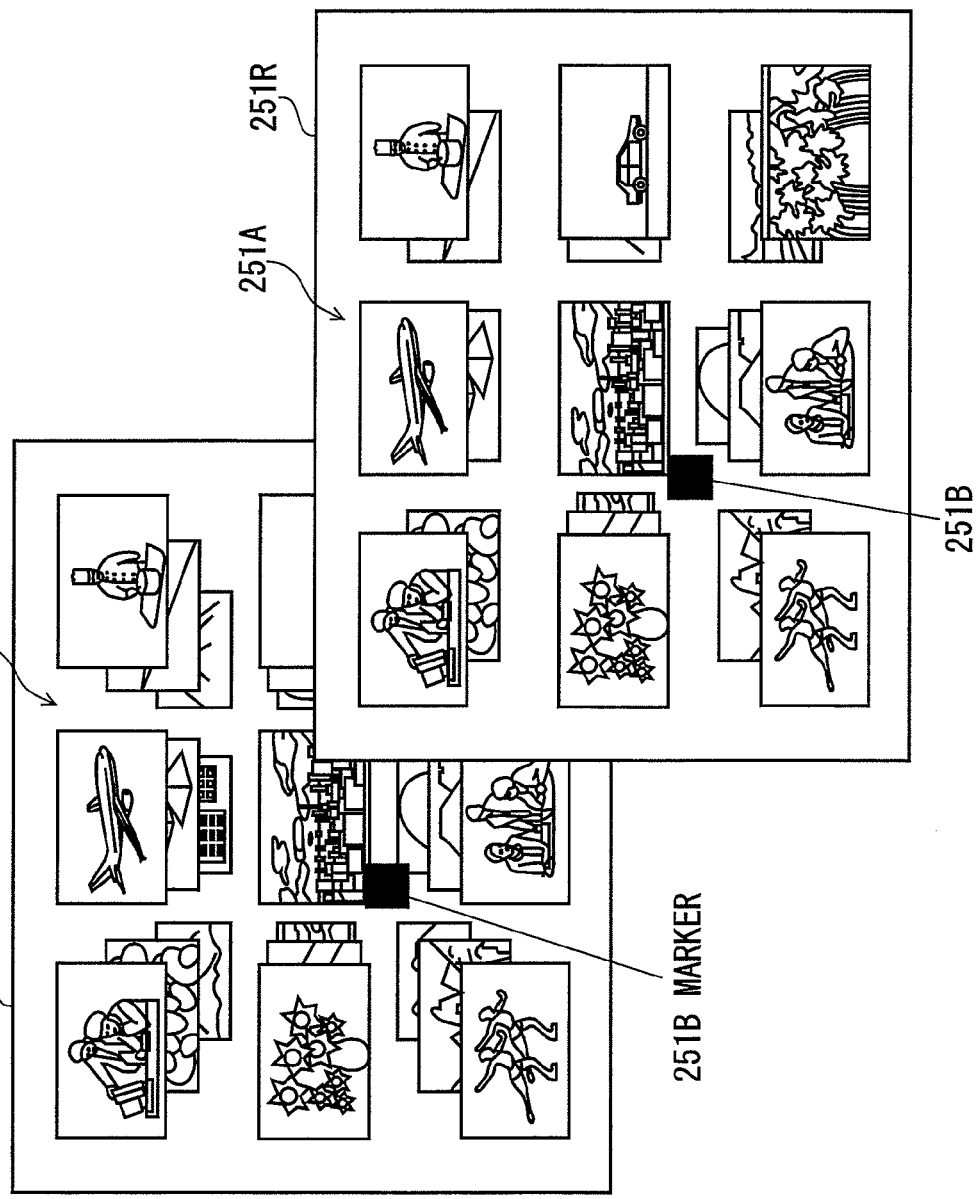
FIG. 5 is a schematic view showing a configuration example of a 3D video image displayed on the display portion.

FIG. 5 is a schematic view showing a configuration example of a 3D image displayed on the display portion 25.

A wall type content display screen 251 is formed by displaying a pair of images consisting of a right visual field wall type content display screen 251L and a left visual field wall type content display screen 251R alternately on the display portion 25. Each visual field wall type content display screen 251L, 251R has a wall type content display 251A and a marker 251B. In the wall type content display 251A, thumbnails of contents are disposed on a plurality of planes. The marker 251B indicates a position designated by a hand of the user.

The wall type content display 251A has a plurality of planes. Equal numbers of thumbnails are disposed on the planes respectively. The user can move a view point to approach a desired plane or move on the plane horizontally or vertically in the screen. Each thumbnail may 3D-displayed when video contents corresponding to the thumbnail are 3D.

Figure 6:
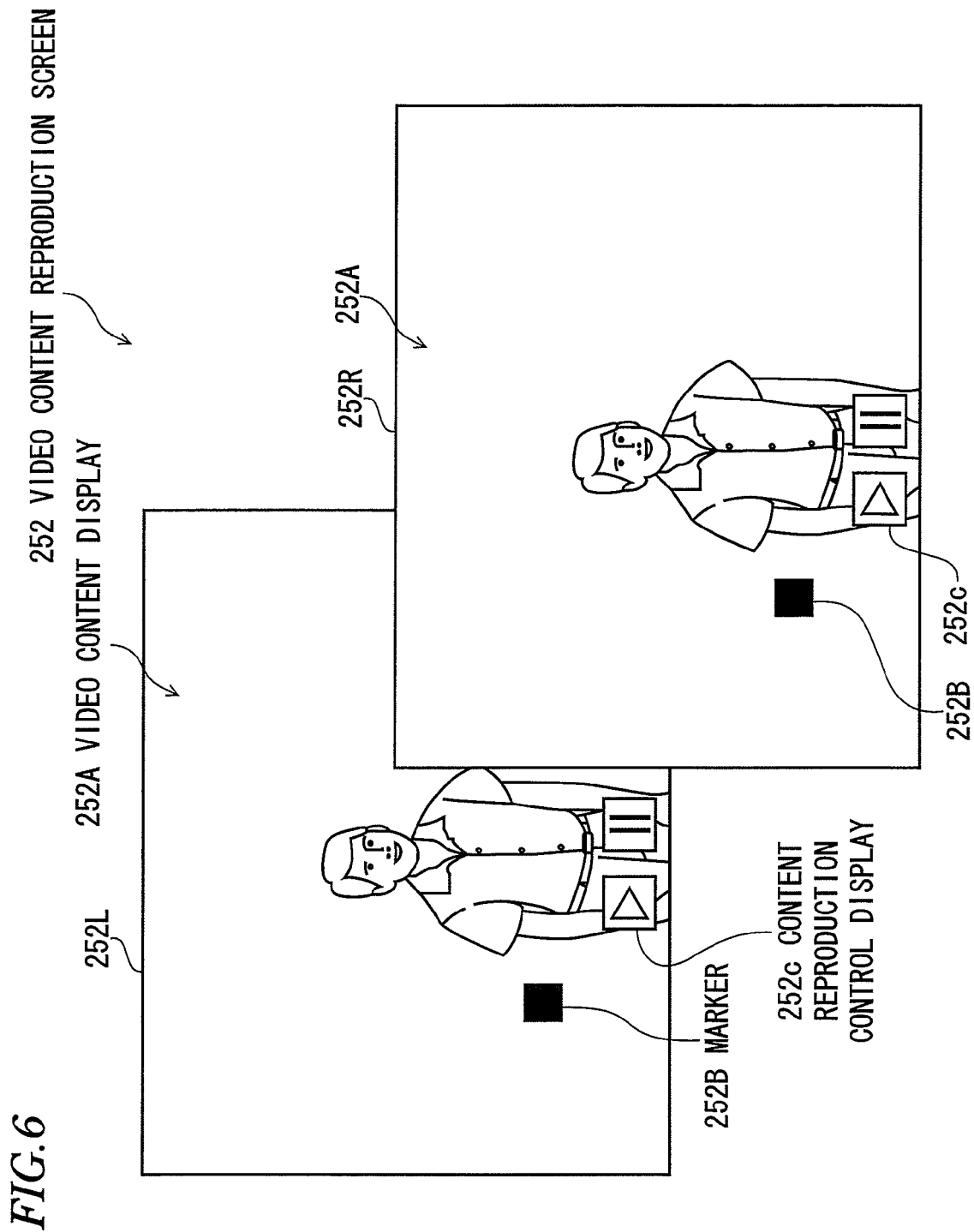
FIG. 6 is a schematic view showing a configuration example of a 3D video image displayed on the display portion.

FIG. 6 is a schematic view showing a configuration example of a 3D image displayed on the display portion 25.

A video content reproduction screen 252 is formed by displaying a pair of images consisting of a right visual field video content reproduction screen 252L and a left visual field video content reproduction screen 252R alternately on the display portion 25. Each visual field video content reproduction screen 252L, 252R has a video content display 252A, a marker 252B and a content reproduction control display 252C. In the video content display 252A, contents are reproduced. The marker 252B indicates a position designated by a hand of the user. The content reproduction control display 252C controls reproduction of the video contents by use of the marker 252B.

The operation of the video reproduction apparatus according to the embodiment will be described below with reference to the drawings.

The basic operations of the video reproduction apparatus 1 will be described below.

When the user 4 faces the distance sensor 3, the distance sensor 3 detects the user 4 as a subject and acquires distance information to the user 4.

Next, the two-hand detection portion 21 detects the closest parts of the user 4 as his/her right and left hands. In addition, the right and left hands are distinguished from each other, for example, according to whether each of the right and left hands is located on the right side of the center or on the left side thereof.

Next, the motion recognizer 22 transmits, as a user's gesture signal to the content display control portion 23, the positions of the right and left hands detected by the two-hand detection portion 21 and the motions of the right and left hands in the depth direction and in a direction perpendicular to the depth direction.

The content display control portion 23 switches and displays the contents shown in FIGS. 4 to 6 in accordance with the user's gesture signal supplied by the motion recognizer 22. The details of the switching operation will be described later.

The display control portion 24 displays, on the display portion 25, the image displayed by the content display control portion 23. When the image is 3D on this occasion, a pair of images with a difference in visual field are displayed on the display portion 25 alternately with a predetermined period of time, while the timing generator 5A is operated in sync with the period of the display.

The timing generator 5A outputs a timing signal with the period of the display so that the shutter glasses 5 worn by the user 4 open and shut the right shutter 5R and the left shutter 5L alternately upon reception of the timing signal. By the aforementioned operation, of the pair of images displayed for the user 4 on the display portion 25, an image corresponding to the visual field of the right eye is visualized for the right eye while an image corresponding to the visual field of the left eye is visualized for the left eye. Thus, the video contents are visualized stereoscopically.

The switching change operations of the content display control portion 23 will be described below.

Figure 7:
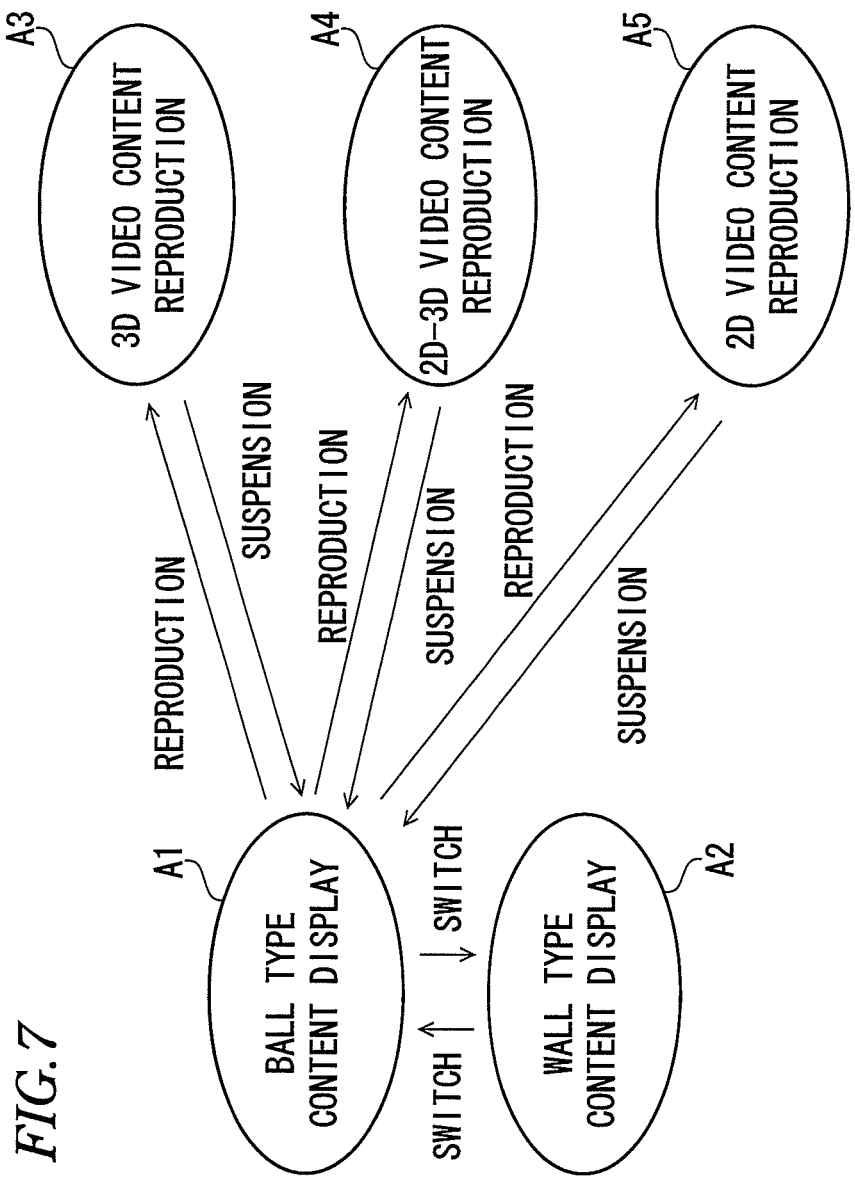
FIG. 7 is a schematic view exemplary showing change among a ball type content display screen, a wall type content display screen and a video content reproduction screen.

FIG. 7 is a schematic view showing change among the ball type content display screen 250, the wall type content display screen 251 and the video content reproduction screen 252.

In a ball type content display mode A1, the video reproduction apparatus 1 displays the ball type content display screen 250 shown in FIG. 4. In a wall type content display mode A2, the video reproduction apparatus 1 displays the wall type content display screen 251 shown in FIG. 5. The ball type content display mode A1 and the wall type content display mode A2 can be switched to each other by user's operation. Switching is, for example, achieved as follows. That is, a switching operation indication prepared in the ball type content display screen 250 or the wall type content display screen 251 is designated by the marker.

In a 3D video content reproduction mode A3, the video reproduction apparatus 1 reproduces the 3D video contents 26b on the video content reproduction screen 252 shown in FIG. 6.

In a 2D-3D video content reproduction mode A4, the video reproduction apparatus 1 reproduces the 3D-converted 2D video contents 26a on the video content reproduction screen 252 shown in FIG. 6.

In a 2D video content reproduction mode A5, the video reproduction apparatus 1 reproduces the 2D video contents 26a on the video content reproduction screen 252 shown in FIG. 6.

Assume that in the ball type content display mode A1 (or the wall type content display mode A2), video contents are designated by the user and an instruction to reproduce the designated video contents is issued by the user. In this case, in accordance with the kind of the contents, the mode is changed over to the 3D video content reproduction mode A3, the 2D-3D video content reproduction mode A4 or the 2D video content reproduction mode A5. In addition, when an instruction to stop the video contents is issued by the user in the 3D video content reproduction mode A3, the 2D-3D video content reproduction mode A4 or the 2D video content reproduction mode A5, the mode is changed over to the ball type content display mode A1 (or the wall type content display mode A2).

Though not shown, the relationship of change between the ball type content display mode A1 and one of the 3D video content reproduction mode A3, the 2D-3D video content reproduction mode A4 and the 2D video content reproduction mode A5 can be also applied to the relationship of change between the wall type content display mode A2 and one of the 3D video content reproduction mode A3, the 2D-3D video content reproduction mode A4 and the 2D video content reproduction mode A5 as described above in parentheses.

The operation of the content display control portion 23 to generate and synthesize images will be described below.

Figure 8:
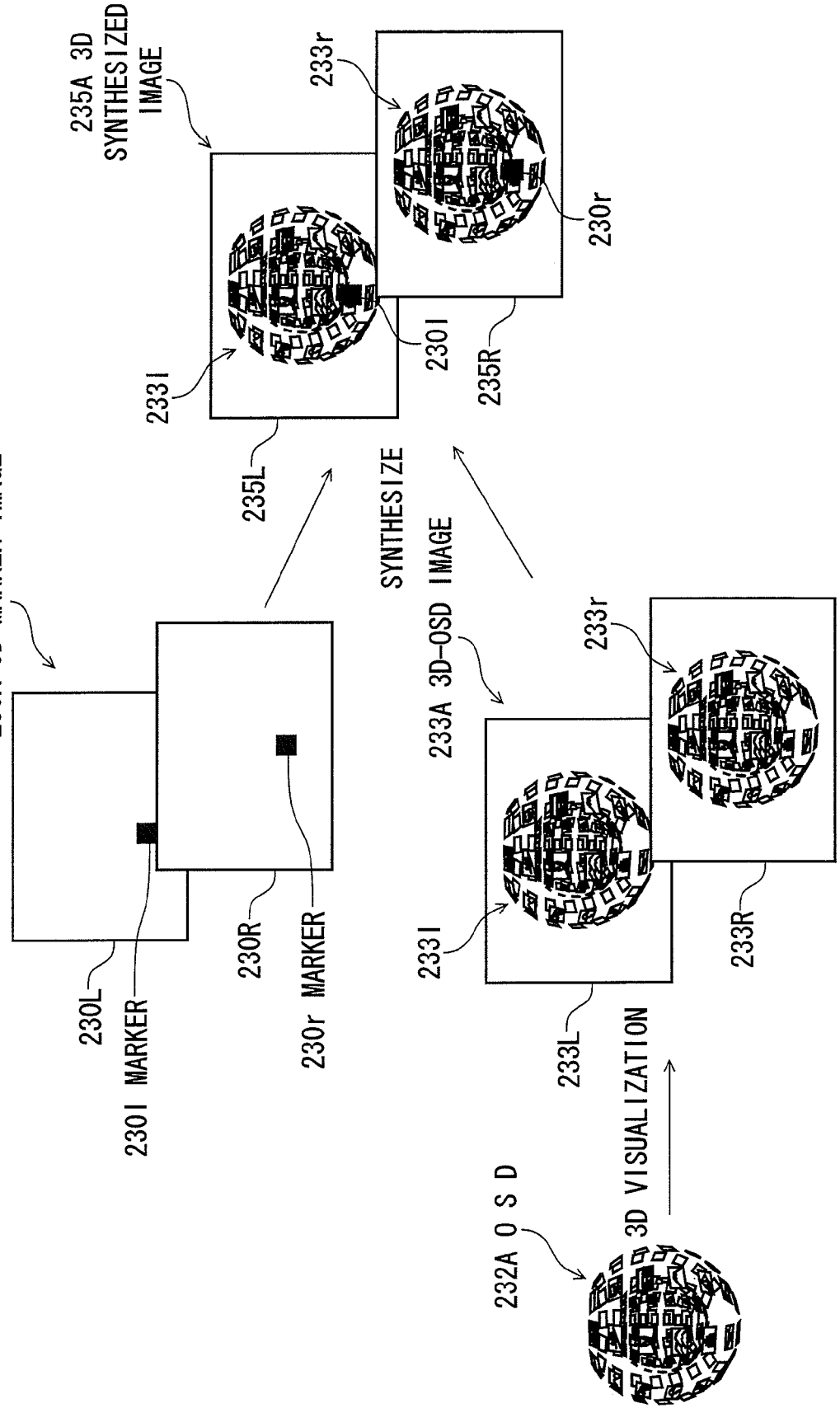
FIG. 8 is a schematic view exemplary showing a configuration of a video image generated by the video reproduction apparatus.

FIG. 8 is a schematic view showing a configuration of a video image generated by the video reproduction apparatus 1. This example shows a screen where an OSD corresponding to the ball type content display 250A shown in FIG. 4 is displayed to allow the user to select video contents to be reproduced.

A marker image 230A is a video image generated by the marker generator 230. The marker image 230A includes marker images 230L and 230R generated for left and right visual fields respectively.

A 3D-OSD image 233A is a video image generated from a 3D OSD 232A on a virtual space by the left and right visual field image generator 233. The 3D-OSD image 233A includes 3D-OSD images 233L and 233R generated for the left and right visual fields respectively.

A 3D synthesized image 235A is a video image obtained by synthesizing the marker image 230A and the 3D-OSD image 233A by the image synthesizer 235. The 3D synthesized image 235A includes 3D synthesized images 235L and 235R generated for the left and right visual fields respectively. The 3D synthesized image 235A displayed on the display portion 25 forms the ball type content display screen 250.

Figure 9:
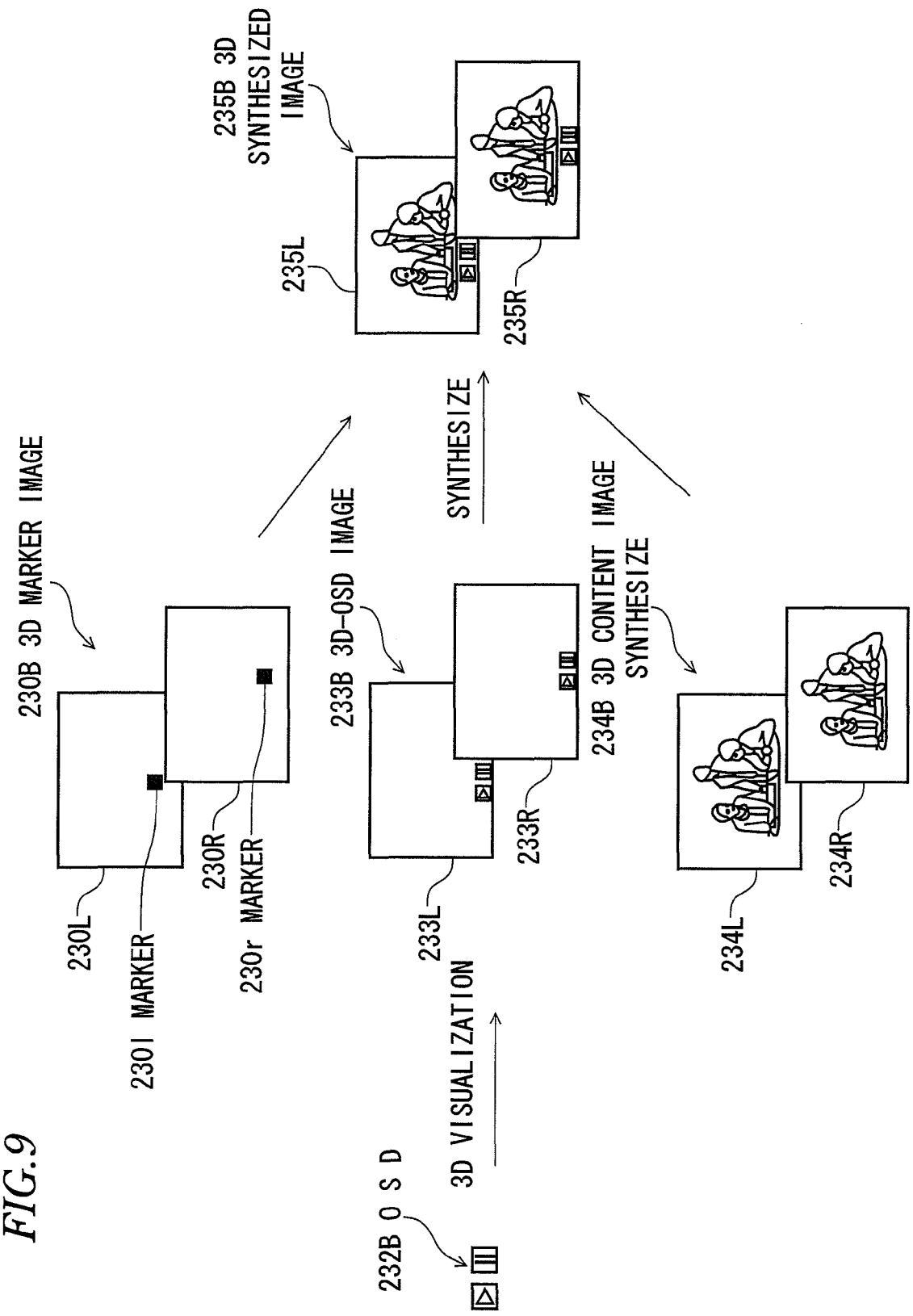
FIG. 9 is a schematic exemplary view showing a configuration of a video image generated by the video reproduction apparatus.

FIG. 9 is a schematic view showing a configuration of a video image generated by the video reproduction apparatus 1. This example shows a screen where OSDs corresponding to the video content display 252A and the content reproduction control display 252c shown in FIG. 6 are displayed to allow the user to perform operations to reproduce video contents and control the reproduction.

A marker image 230B is a video image generated by the marker generator 230. The marker image 230B includes marker images 230L and 230R generated for the left and right visual fields respectively.

A 3D-OSD image 233B is a video image generated from a 3D-OSD 232B on a virtual space by the left and right visual field image generator 233. The 3D-OSD image 233B includes 3D-OSD images 233L and 233R generated for the left and right visual fields respectively.

A 3D content image 234B is a video image obtained by reproducing video contents by the content reproducer 234. The 3D content image 234B includes 3D content images 234L and 234R generated for the left and right visual fields respectively.

A 3D synthesized image 235B is a video image obtained by synthesizing the marker image 230B, the 3D-OSD image 233B and the 3D content image 234B by the image synthesizer 235. The 3D synthesized image 235B includes 3D synthesized images 235L and 235R generated for the left and right visual fields respectively. The 3D synthesized image 235B displayed on the display portion 25 forms the video content reproduction screen 252.

FIGS. 10A to 10D are schematic views showing configuration examples of pairs of video images with a difference in visual field.

Figure 10A:
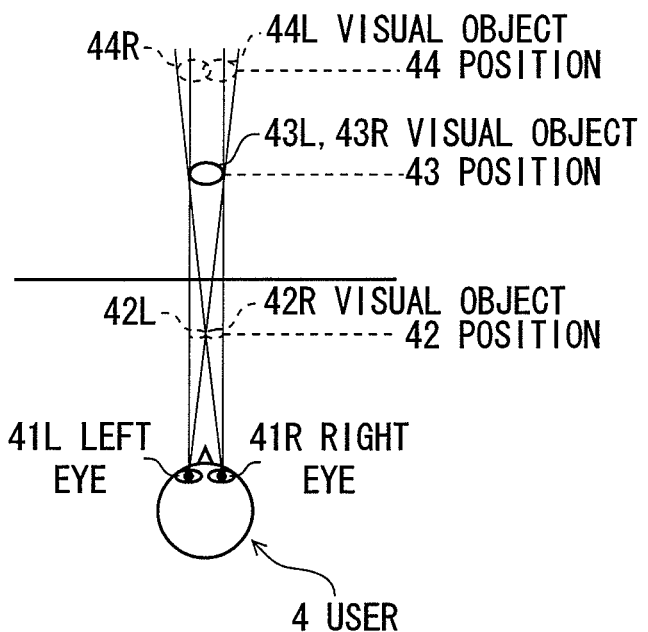
FIGS. 10A to 10D are schematic views exemplary showing configuration examples of pairs of video images with a difference in visual field.
Figure 10B:
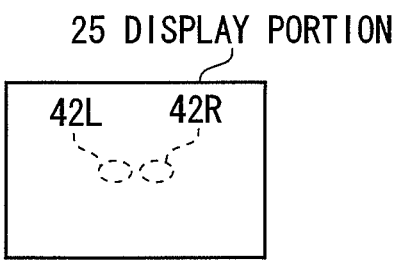

Assume that in the positional relationship between the user 4 and a display portion screen position 25a, a visual object should be stereoscopically viewed by the user as if the subject were disposed in a position 42 as shown in FIG. 10A. In this case, visual subjects 42L and 42R are drawn on the screen portion 25 as shown in FIG. 10B. The visual subject 42L is a video image to be viewed only by a left eye 41L, and the visual subject 42R is a video image to be viewed only by a right eye 41R.

Figure 10C:
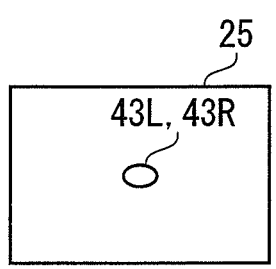
Figure 10D:
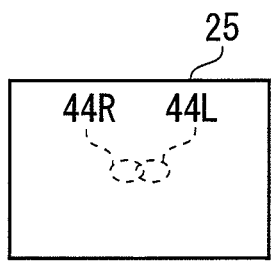

In the same manner, assume that a visual object should be stereoscopically viewed by the user as if the subject were disposed in a position 43 or a position 44. In this case, visual subjects 43L and 43R or visual subjects 44L and 44R are drawn on the screen portion 25 as shown in FIG. 10C or 10D. That is, when a subject should be viewed more closely to the user 4, the distance between the left and right visual field images of the subject becomes longer. When a subject should be viewed at a predetermined distance from the user 4, the distance between the left and right visual field images of the subject is zero. When a subject should be viewed at a longer distance from the user 4, the left and right visual field images of the subject are replaced by each other and the distance therebetween becomes longer.

As described above, the 3D-OSD image 233A or 233B consisting of a pair of images with a difference in visual field is generated from the OSD 232A or 232B shown in FIG. 8 or 9. In addition, markers 230l and 230r are generated in a similar method by the marker generator 230.

Figure 10E:
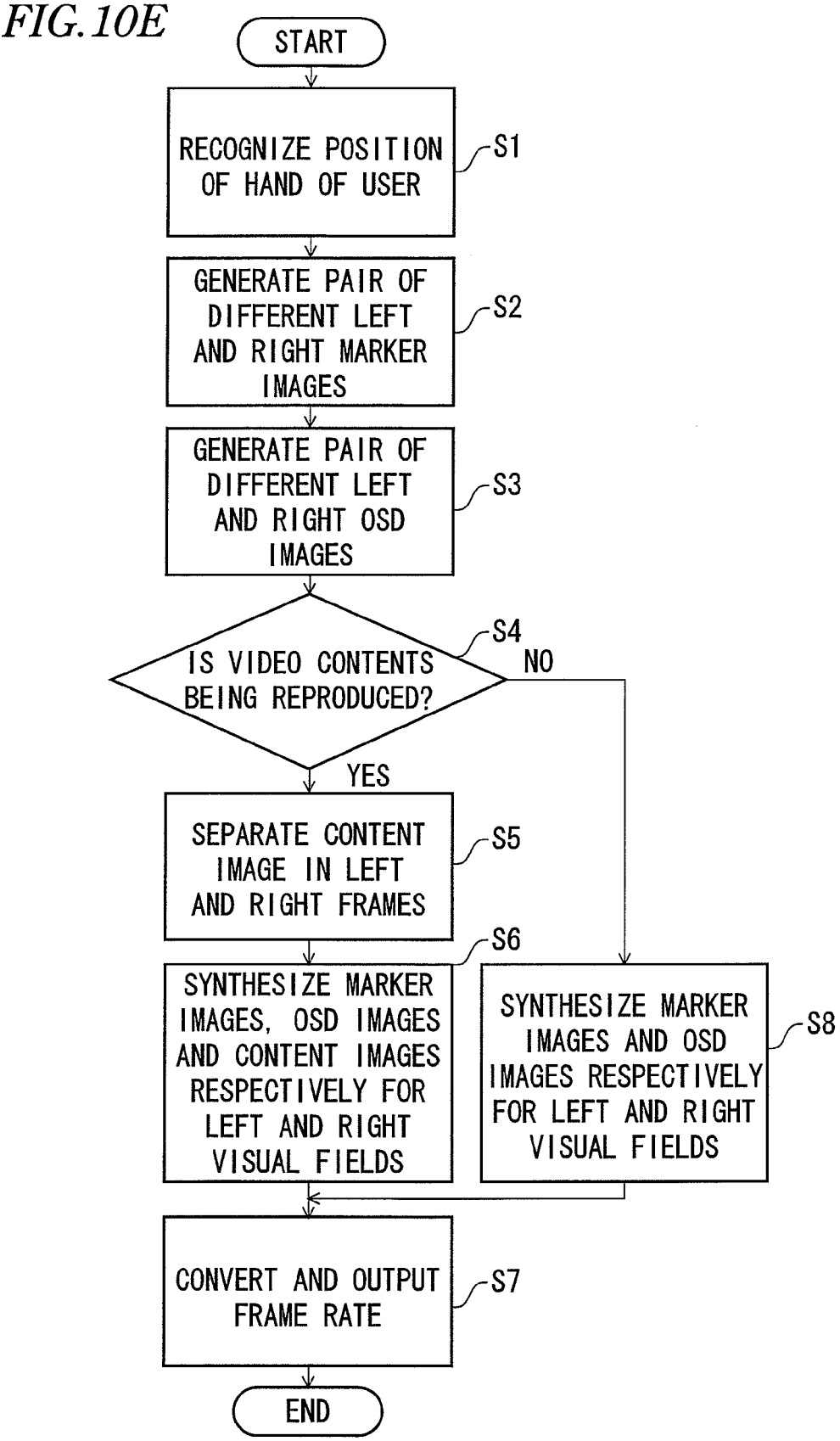
FIG. 10E is a flow chart showing an example of video image synthesizing operation of the video reproduction apparatus.

FIG. 10E is a flow chart showing an example of video image synthesizing operation of the video reproduction apparatus 1.

First, the 3D-OSD generator 232 recognizes the position of a hand of a user based on the designated coordinates and the user's gesture signal received from the motion recognizer 22 (S1). In addition, the marker generator 230 generates a pair of different marker images 230L and 230R for the left and right visual fields as shown in FIGS. 8 and 9, based on the position of the hand of the user (S2).

Next, the left and right visual field image generator 233 generates a pair of different 3D-OSD images 233L and 233R for the left and right visual fields as shown in FIGS. 8 and 9, based on the OSD 232A or 232B generated on a virtual space by the 3D-OSD generator 232 (S3).

Next, when video contents corresponding to the modes A3 to A5 in FIG. 7 is being reproduced (YES in S4), the content image being reproduced is separated into 3D content images 234L and 234R for the left and right frames respectively by the content reproducer 234 (S5). Here, assume that the 2D video contents 26a have been converted into 3D images in the 2D-3D video conversion portion 234a.

Next, the image synthesizer 235 synthesizes the marker images 230L and 230R, the 3D-OSD images 233L and 233R and the 3D content images 234L and 234R for the left and right visual fields respectively so as to generate a 3D synthesized image 235B as shown in FIG. 9 (S6).

Next, since the number of frames of the 3D synthesized image 235B is twice as large as the number of frames of a normal image, the display control portion 24 doubles the frame rate and outputs the doubled frame rate to the display portion 25 (S7). In addition, the display control portion 24 outputs the doubled frame rate to the timing generator 5A to synchronize the shutter control of the shutter glasses 5 with the display of the 3D synthesized image 235A or 235B.

On the other hand, when video contents are not being reproduced in Step S4 as in a state corresponding to the mode A1 or A2 in FIG. 7 (NO in S4), the image synthesizer 235 synthesizes the marker images 230L and 230R and the 3D-OSD images 233L and 233R for the left and right visual fields respectively so as to generate a 3D synthesized image 235A as shown in FIG. 8 (S8).

The association of operation of the video reproduction apparatus 1 with the gesture of user 4 will be described below.

FIGS. 11A and 11B are schematic views showing the gesture of the user 4 and a display example of the video reproduction apparatus 1.

As shown in FIG. 11A, the video reproduction apparatus 1 displays the 3D synthesized image 25A including the ball type 3D-OSD 25B and the 3D marker 25C on the display portion 25. The 3D marker 25C is displayed in accordance with the position of the left hand 40L of the user 4 by the marker generator 230. The 3D marker 25C is displayed in accordance with the designated coordinates of each of the left and right hands 40L and 40R of the user 4. In the following explanation, "the 3D-marker 25C designates" is synonymous with the designated coordinates indicate an operated part of the 3D-OSD 232A or the 3D-OSD 232B on a virtual space.

In addition, when the 3D marker 25C designates a thumbnail of the 3D-OSD 25B, a selection frame 25c is displayed on the thumbnail, and the thumbnail is put in a selected state. To put a thumbnail in a selected state, the thumbnail must be designated by the 3D marker 25C for a predetermined time, for example, for two seconds.

In addition, as shown in FIG. 11B, when the motion recognizer 22 recognizes that the left hand 40L has been moved in the depth direction, the marker generator 230 moves the 3D marker 25C in the depth direction in the 3D synthesized image 25A in proportion to the moving distance of the left hand 40L. When the 3D marker 25C designates a thumbnail disposed on a sphere near the center, the thumbnail is put into a selected state by a selection frame 25c.

FIGS. 12A and 12B are schematic views showing the gesture of the user 4 and another display example of the video reproduction apparatus 1.

As shown in FIG. 12A, assume that the 3D marker 25C is located near the outermost sphere of the 3D-OSD. In this case, when the motion recognizer 22 recognizes that the left hand 40L has been moved to the right more quickly than usual, only the outermost sphere of the 3D-OSD is rotated in proportion to the moving distance of the left hand 40L.

On the other hand, as shown in FIG. 12B, assume that the 3D marker 25C is located near a sphere close to the center of the 3D-OSD. In this case, when the motion recognizer 22 recognizes that the left hand 40L has been moved to the right more quickly than usual, only the sphere close to the center of the 3D-OSD is rotated in proportion to the moving distance of the left hand 40L.

Figure 13B:
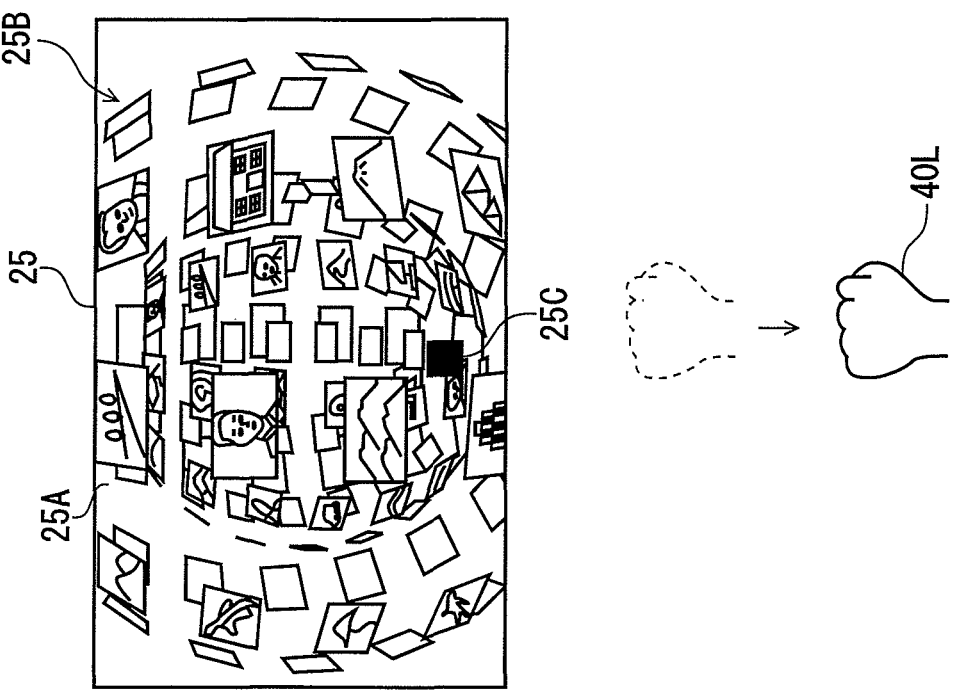
FIGS. 13A and 13B are schematic views showing the gesture of the user and further another display example of the video reproduction apparatus.
Figure 13A:
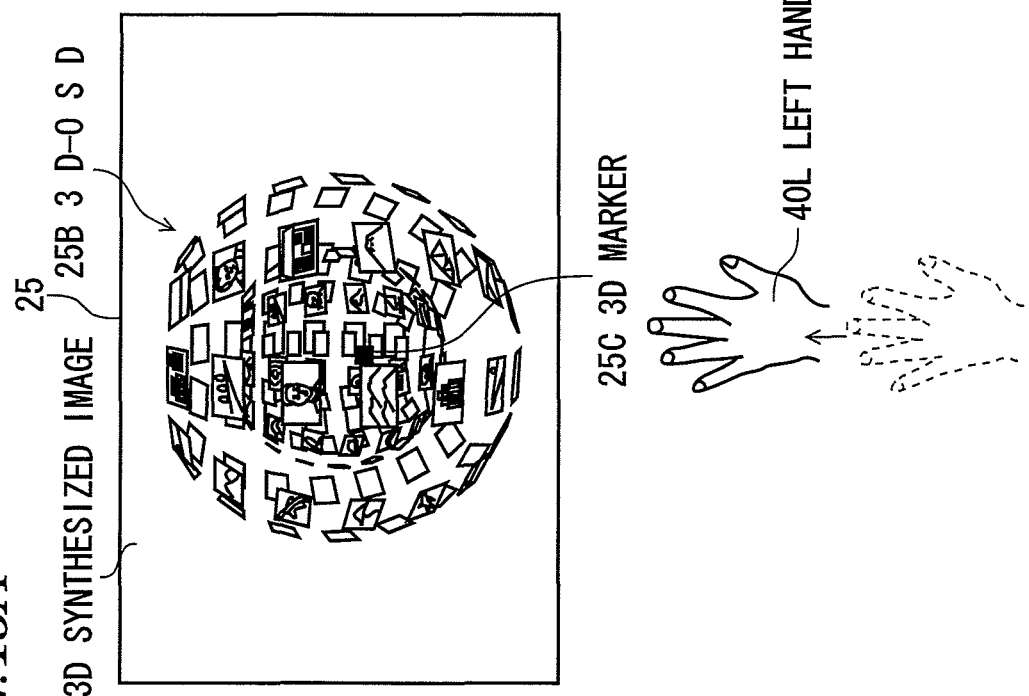

FIGS. 13A and 13B are schematic views showing the gesture of the user 4 and further another display example of the video reproduction apparatus 1.

As shown in FIG. 13A, when the motion recognizer 22 recognizes that the left hand 40L has been moved in the depth direction, the marker generator 230 moves the 3D marker 25C in the depth direction in the 3D synthesized image 25A in proportion to the moving distance of the left hand 40L.

On the other hand, as shown in FIG. 13B, when the motion recognizer 22 recognizes that the left hand 40L has been clenched and moved toward the user 4, the 3D-OSD generator moves the view point in the depth direction so as to pull the 3D-OSD toward the user 4.

FIGS. 14A and 14B are schematic views showing the gesture of the user 4 and a display example of the video reproduction apparatus 1.

As shown in FIG. 14A, the video reproduction apparatus 1 displays the 3D synthesized image 25A including a wall type 3D-OSD 25E and a 3D marker 25C on the display portion 25. The 3D marker 25C is displayed in accordance with the position of the left hand 40L of the user 4 by the marker generator 230.

In addition, when the 3D marker 25C designates a thumbnail of the 3D-OSD 25E, a selection frame 25c is displayed on the thumbnail to put the thumbnail into a selected state. To put a thumbnail into a selected state, the thumbnail must be designated by the 3D marker 25C for a predetermined time, for example, for two seconds.

As shown in FIG. 14B, when the motion recognizer 22 recognizes that the left hand 40L has been moved in the depth direction, the marker generator 230 moves the 3D marker 25C in the depth direction in the 3D synthesized image 25A in proportion to the moving distance of the left hand 40L. When the 3D marker 25C designates a thumbnail disposed on a plane in the depth direction, the thumbnail is put into a selected state by a selection frame 25c.

Figure 15A:
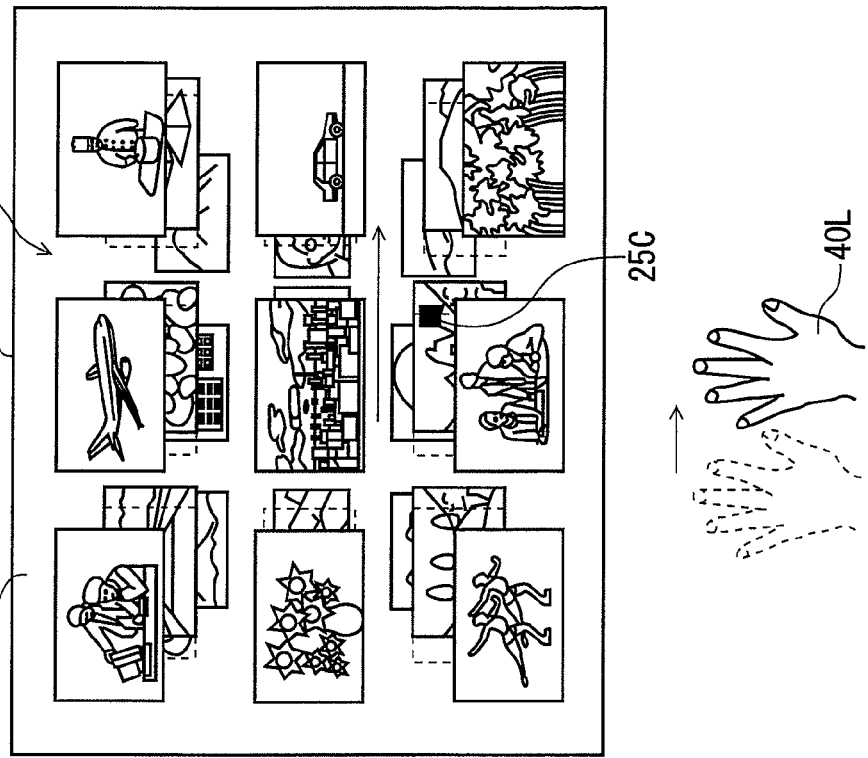
FIGS. 15A and 15B are schematic views showing the gesture of the user and another display example of the video reproduction apparatus.
Figure 15B:
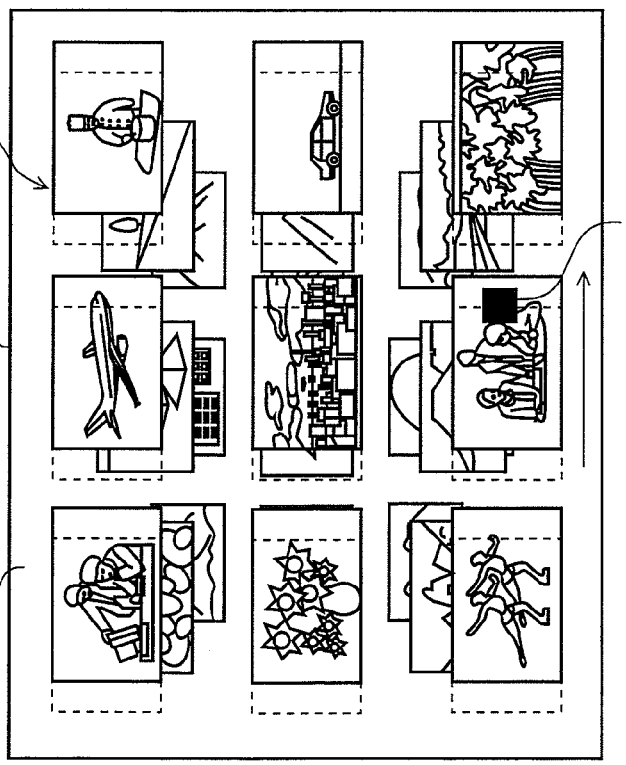

FIGS. 15A and 15B are schematic views showing the gesture of the user 4 and another display example of the video reproduction apparatus 1.

As shown in FIG. 15A, assume that the 3D marker 25C is located near the closest plane of the 3D-OSD 25E to the user 4. In this case, when the motion recognizer 22 recognizes that the left hand 40L has been moved to the right more quickly than usual, only the closest plane of the 3D-OSD to the user 4 is moved in parallel in proportion to the moving distance of the left hand 40L.

On the other hand, as shown in FIG. 15B, assume that the 3D marker 25C is located near a deeper plane of the 3D-OSD. In this case, when the motion recognizer 22 recognizes that the left hand 40L has been moved to the right more quickly than usual, only the deeper plane of the 3D-OSD is moved in parallel in proportion to the moving distance of the left hand 40L.

FIGS. 16A and 16B are schematic views showing the gesture of the user 4 and further another display example of the video reproduction apparatus 1.

FIGS. 16C to 16E are schematic views showing the gesture of the user 4 and further another display example of the video reproduction apparatus 1. FIG. 16C corresponds to FIG. 16A, and FIG. 16D corresponds to FIG. 16B. Each of FIGS. 16A, 16B, 16C and 16D, the user 4 is viewed from side.

As shown in FIG. 16A, the video reproduction apparatus 1 displays the 3D synthesized image 25A including a volume control bar 253B, a reproduction position bar 254B, an input switch bar 255B and a 3D marker 25C on the display portion 25. The bars 253B, 254B and 255B are 3D-OSDs for controlling the operation of the video reproduction apparatus 1. The 3D marker 25C is displayed in accordance with the position of the left hand 40L of the user 4 by the marker generator 230.

The volume control bar 253B controls the size of the volume to be outputted in the video reproduction apparatus 1.

The reproduction position bar 254B indicates the position of the reproduction time of video contents being reproduced in the video reproduction apparatus 1.

The input switch bar 255B selects a source of an image to be displayed in the video reproduction apparatus 1, for example, from a video input, a TV broadcast, another external input, etc.

When the left hand 40L is located as shown in FIG. 16C, the 3D marker 25C is displayed near the volume control bar 253B as shown in FIG. 16A. Here, assume that a volume cursor 253b is selected. In this case, when the motion recognizer 22 recognizes that the left hand 40L has been moved to the right, the volume cursor 253b is moved in parallel in proportion to the moving distance of the left hand 40L. As a result, the operation signal generator 236 outputs a control signal to control the volume.

On the other hand, when the left hand 40L is located as shown in FIG. 16D, the 3D marker 25C is displayed near the reproduction position bar 254B as shown in FIG. 16B. Here, assume that a reproduction position cursor 254b is selected. In this case, when the motion recognizer 22 recognizes that the left hand 40L has been moved to the right, the reproduction position cursor 254b is moved in parallel in proportion to the moving distance of the left hand 40L. As a result, the operation signal generator 236 outputs a control signal to change the reproduction position.

The association of operation of the video reproduction apparatus 1 with the gesture of user 4 in 2D display will be described below.

Figure 17A:
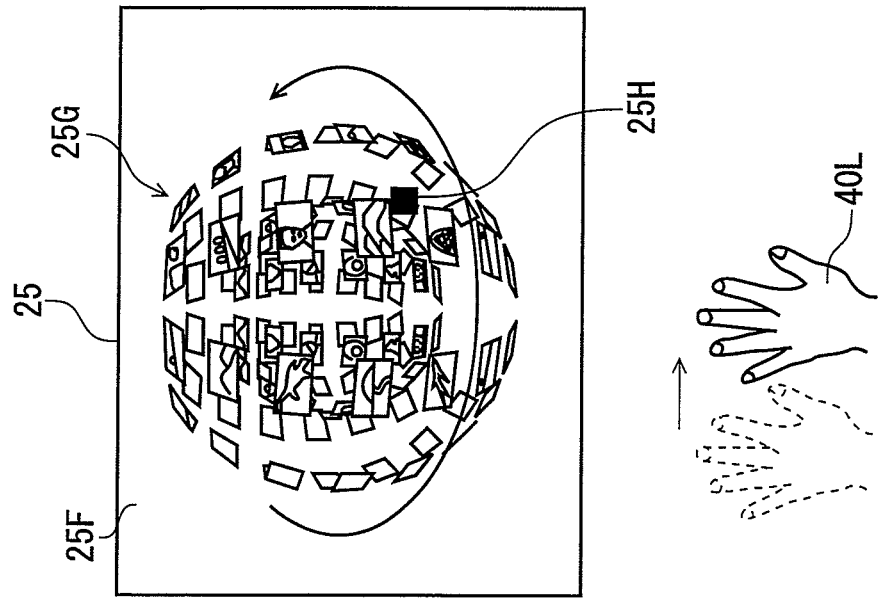
FIGS. 17A and 17B are schematic views showing the gesture of the user and a display example of the video reproduction apparatus.
Figure 17B:
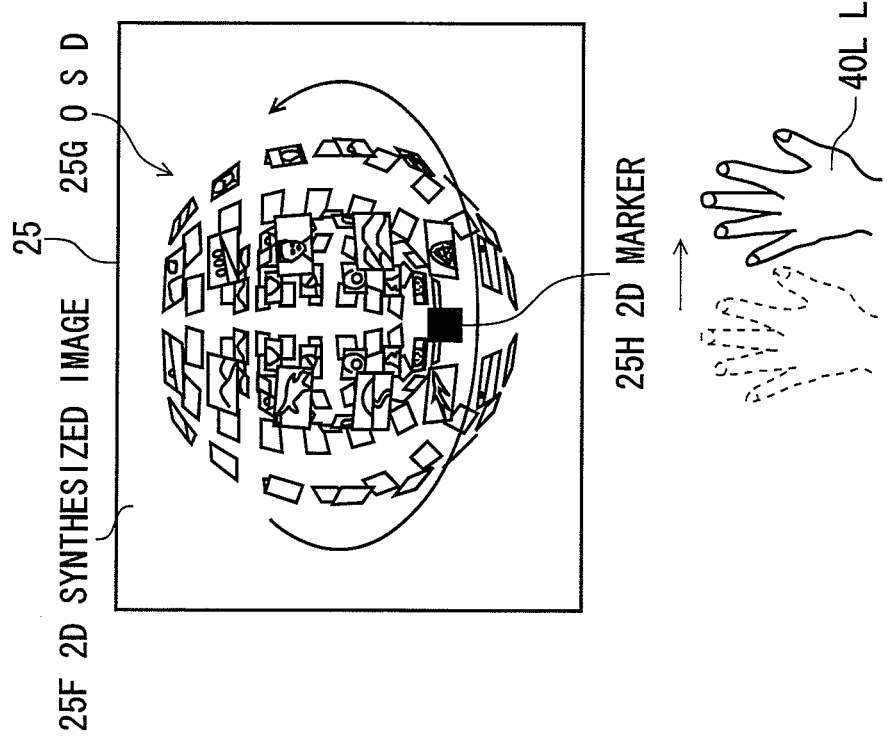

FIGS. 17A and 17B are schematic views showing the gesture of the user 4 and a display example of the video reproduction apparatus 1.

When the display is 2D, the video reproduction apparatus 1 displays a 2D synthesized image 25F including a 2D marker 25H and a 2D OSD 25G on the display portion 25 as shown in FIG. 17A. When the motion recognizer 22 recognizes that the left hand 40L has been moved to the right, the OSD 25G is rotated in proportion to the moving distance of the left hand 40L as shown in FIG. 17B.

FIGS. 18A to 18C are schematic views showing the gesture of the user 4 and another display example of the video reproduction apparatus 1.

When the motion recognizer 22 recognizes that the left hand 40L and the right hand 40R have been pushed out as shown in FIG. 18A and recognizes that the both hands have been expanded to the outside as shown in FIGS. 18B and 18C, the display scale of the OSD 25G is expanded in proportion to the moving distance of the hands, that is, the view point on the display is moved to approach the center. On the contrary, when the motion recognizer 22 recognizes that the both hands have been narrowed to the inside, the view point on the display is moved to keep away from the center.

Figure 19:
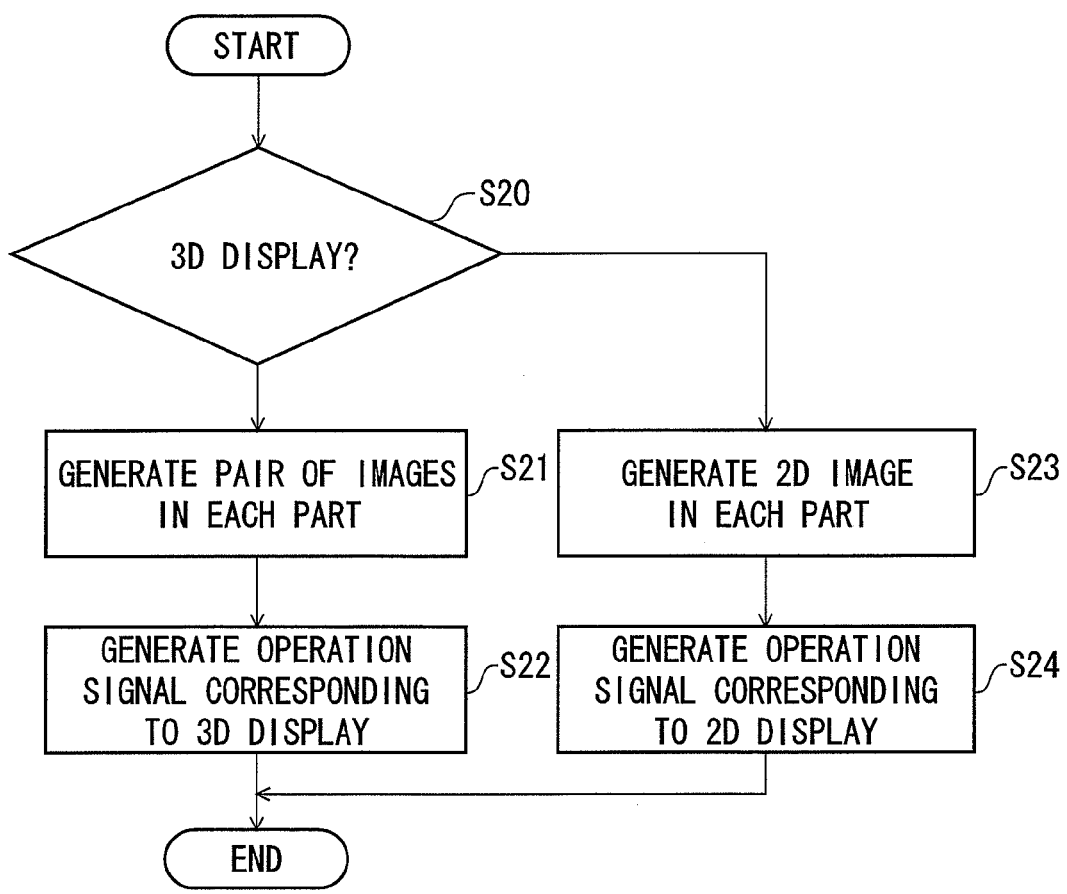
FIG. 19 is a flow chart showing an example of video image synthesizing operation of the video reproduction apparatus, in which display is switched between 2D and 3D.

FIG. 19 is a flow chart showing an example of video image synthesizing operation of the video reproduction apparatus 1, in which display is switched between 2D and 3D.

When 3D display is carried out (YES in S20), the content display control portion 23 operates the respective portions as described in FIG. 1 to FIG. 16B. That is, the content display control portion 23 operates the respective portions of the video reproduction apparatus 1 to generate a pair of images for each video image so as to allow the user to stereoscopically view 3D-OSD or 3D video contents (S21). In addition, the operation signal generator 236 generates an operation signal corresponding to the 3D display (S22).

On the other hand, when 3D display is not carried out in Step S20 but all the video images are 2D-displayed (NO in S20), the marker generator 230 generates a marker as a 2D image, the left and right visual field image generator 233 suspends its function and generates an image based on one viewpoint from 3D-OSD, the content reproducer 234 reproduces 2D video contents and suspends the operation of the 2D-3D video conversion portion 234a, and the image synthesizer 235 synthesizes these 2D images (S23).

Next, based on a user's gesture signal outputted by the motion recognizer 22, the operation signal generator 236 generates an operation signal corresponding to 2D display as shown in FIGS. 17A and 17B and 18A to 18C, which operation signal is different from that in 3D display (S24).

According to the aforementioned embodiment, in the video reproduction apparatus 1, a 3D-OSD image 233A (233B) as an operational object is synthesized with a 3D marker image 230A (230B) indicating a position designated in a 3D space by the left and right hands 40L and 40R of the user 4. Thus, a 3D synthesized image 235A (235B) is generated. At the same time, an operation signal to control the respective portions of the video reproduction apparatus 1 is generated based on the position designated by the marker and a user's gesture signal. Thus, the three-dimensional gesture of the user can be recognized, while the three-dimensional user's operation on the operational object can be displayed. It is therefore possible for the user to carry out visceral control corresponding to his/her gesture.

The method of stereoscopic viewing as described in this embodiment, that is, the method in which a pair of different images for left and right visual fields are displayed alternately may be replaced by a method in which a pair of different images for left and right visual fields are set out and displayed alternately scanning line by scanning line in each frame by use of a liquid crystal panel which performs pixel display changing the polarization direction scanning line by scanning line. In this case, the user 4 uses polarized glasses including right and left lenses whose polarization directions have been changed from each other.

Although the two-hand detection portion 21 detects hands, it may detect parts such as a head, legs, etc. other than hands, or a whole body. Further, another input device may be used if it can detect a designated position and the gesture of the user 4 in 3D.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video reproduction apparatus comprising:
   an image generator configured to generate a first pair of images with a difference in visual field for a three-dimensional operational object, the three-dimensional operational object comprising a plurality of video contents provided as thumbnails in a three-dimensional virtual space, the three-dimensional operational object being configured to allow a user to select, in a depth direction and in directions perpendicular to the depth direction, one or more of the video contents to be reproduced;
   a motion recognizer configured to recognize a position and a motion of a user gesture in a depth direction and in directions perpendicular to the depth direction;
   a marker generator configured to identify three-dimensional coordinates based on the gesture recognized by the motion recognizer, and to generate a second pair of images with a difference in visual field for a marker corresponding to the coordinates, the marker being configured to allow the user to operate the operational object in the depth direction and in the directions perpendicular to the depth direction;
   an operation signal generator configured to generate an operation signal based on a positional relationship between the coordinates of the marker and the operational object; and
   an image synthesizer configured to synthesize the first pair of images with the second pair of images to generate a third pair of images.

2. The video reproduction apparatus of claim 1, further comprising:
   a content reproducer configured to reproduce video contents based on the operation signal generated by the operation signal generator so as to generate a fourth pair of images;
   wherein the image synthesizer is configured to synthesize the first pair of images, the second pair of images and the fourth pair of images so as to generate the third pair of images.

3. The video reproduction apparatus of claim 1, wherein:
   the operation signal generator is configured to generate different operation signals based on a motion recognized by the motion recognizer.

4. A video reproduction method comprising:
   generating a first pair of images with a difference in visual field for a three-dimensional operational object, the three-dimensional operational object comprising a plurality of video contents provided as thumbnails in a three-dimensional virtual space, the three-dimensional operational object being configured to allow a user to select video contents to be reproduced;
   recognizing a position and a motion of a user gesture in a depth direction and in directions perpendicular to the depth direction;
   identifying three-dimensional coordinates based on the recognized gesture;
   generating a second pair of images with a difference in visual field for a marker corresponding to the three-dimensional coordinates, the marker being configured to allow the user to operate the operational object in the depth direction and in the directions perpendicular to the depth direction;
   generating an operation signal based on a positional relationship between the coordinates of the marker and the operational object; and
   synthesizing the first pair of images with the second pair of images to generate a third pair of images.

* * * * *